US012795654B2

(12) United States Patent
Abotabl et al.

(10) Patent No.: US 12,795,654 B2
(45) Date of Patent: Nov. 10, 2026

(54) UPLINK CONFIGURED GRANT OF FULL DUPLEX CAPABLE USER EQUIPMENT

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 362 days.

(21) Appl. No.: 18/398,996

(22) Filed: Dec. 28, 2023

(65) Prior Publication Data

US 2025/0220666 A1 Jul. 3, 2025

(51) Int. Cl.
*H04W 72/1268* (2023.01)
*H04L 5/14* (2006.01)
*H04W 16/28* (2009.01)
*H04W 72/20* (2023.01)

(52) U.S. Cl.
CPC ........... *H04W 72/1268* (2013.01); *H04L 5/14* (2013.01); *H04W 16/28* (2013.01); *H04W 72/20* (2023.01)

(58) Field of Classification Search
CPC ...... H04W 72/1268; H04W 72/20; H04L 5/14
See application file for complete search history.

(56) References Cited

U.S. PATENT DOCUMENTS

2019/0140811 A1 5/2019 Abedini et al.
2021/0321409 A1* 10/2021 Fakoorian ............. H04W 72/23
2023/0239841 A1 7/2023 Zhou et al.
2024/0032042 A1* 1/2024 Abotabl ..................... H04L 5/16

FOREIGN PATENT DOCUMENTS

WO WO-2023206524 A1 11/2023

OTHER PUBLICATIONS

International Search Report and Written Opinion—PCT/US2024/054964—ISA/EPO—Feb. 18, 2025.

* cited by examiner

*Primary Examiner* — Won Tae C Kim
(74) *Attorney, Agent, or Firm* — Holland & Hart LLP

(57) ABSTRACT

Methods, systems, and devices for wireless communication are described. For example, a user equipment (UE) may receive a grant indicating one or more resources allocated to the UE for uplink transmission. These one or more resources may include one or more half duplex slots and one or more full duplex slots. The UE may receive an indication of at least one configuration associated with the one or more half duplex slots, the one or more full duplex slots, or both. For instance, the at least one configuration may indicate a set of parameters that correspond to the one or more half duplex slots, the one or more full duplex slots, or both. Subsequently, the UE may transmit one or more uplink messages based on the at least one configuration.

28 Claims, 15 Drawing Sheets

UPLINK CONFIGURED GRANT OF FULL DUPLEX CAPABLE USER EQUIPMENT

FIELD OF TECHNOLOGY

The following relates to wireless communication, including uplink configured grant of full duplex capable user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support uplink (UL) configured grant of full duplex capable user equipment (UE). For example, the described techniques provide for a UE to receive a grant indicating one or more resources (e.g., uplink resources) allocated to the UE for uplink transmission (e.g., for transmitting one or more uplink messages). These one or more resources may include one or more half duplex slots and one or more full duplex slots. The UE may receive an indication of at least one configuration associated with the one or more half duplex slots, the one or more full duplex slots, or both (e.g., the configuration may be specific to a type of slot or correspond to each type of slot). For example, the at least one configuration may indicate a set of parameters that correspond to the one or more half duplex slots, the one or more full duplex slots, or both. Subsequently, the UE may transmit one or more uplink messages based on the at least one configuration. For instance, the UE may transmit, or refrain from transmitting, the one or more uplink messages during the one or more half duplex slots, the one or more full duplex slots, or both.

A method for wireless communications by a UE is described. The method may include receiving a grant indicating a set of multiple resources allocated to the UE for uplink transmission, where the set of multiple resources includes one or more half duplex slots and one or more full duplex slots, receiving control signaling indicating at least one configuration associated with the one or more half duplex slots, the one or more full duplex slots, or both, where the at least one configuration indicates one or more parameters corresponding to the one or more half duplex slots, the one or more full duplex slots, or both, and transmitting one or more uplink messages in accordance with the grant and the control signaling.

A UE for wireless communications is described. The UE may include one or more memories storing processor executable code, and one or more processors coupled with the one or more memories. The one or more processors may individually or collectively operable to execute the code to cause the UE to receive a grant indicating a set of multiple resources allocated to the UE for uplink transmission, where the set of multiple resources include one or more half duplex slots and one or more full duplex slots, receive control signaling indicating at least one configuration associated with the one or more half duplex slots, the one or more full duplex slots, or both, where the at least one configuration indicates one or more parameters corresponding to the one or more half duplex slots, the one or more full duplex slots, or both, and transmit one or more uplink messages in accordance with the grant and the control signaling.

Another UE for wireless communications is described. The UE may include means for receiving a grant indicating a set of multiple resources allocated to the UE for uplink transmission, means for where the set of multiple resources includes one or more half duplex slots and one or more full duplex slots, means for receiving control signaling indicating at least one configuration associated with the one or more half duplex slots, the one or more full duplex slots, or both, means for where the at least one configuration indicates one or more parameters corresponding to the one or more half duplex slots, the one or more full duplex slots, or both, and means for transmitting one or more uplink messages in accordance with the grant and the control signaling.

A non-transitory computer-readable medium storing code for wireless communications is described. The code may include instructions executable by a processor to receive a grant indicating a set of multiple resources allocated to the UE for uplink transmission, where the set of multiple resources include one or more half duplex slots and one or more full duplex slots, receive control signaling indicating at least one configuration associated with the one or more half duplex slots, the one or more full duplex slots, or both, where the at least one configuration indicates one or more parameters corresponding to the one or more half duplex slots, the one or more full duplex slots, or both, and transmit one or more uplink messages in accordance with the grant and the control signaling.

Some examples of the method, UEs, and non-transitory computer-readable medium described herein may further include operations, features, means, or instructions for transmitting an indication of a full duplexing capability associated with the UE and where the control signaling may be based on the indication.

In some examples of the method, UEs, and non-transitory computer-readable medium described herein, transmitting the one or more uplink messages may include operations, features, means, or instructions for transmitting the one or more uplink messages using the one or more half duplex slots in accordance with the at least one configuration.

Some examples of the method, UEs, and non-transitory computer-readable medium described herein may further include operations, features, means, or instructions for refraining from transmitting during the one or more full duplex slots based on the at least one configuration only applying to the one or more half duplex slots.

In some examples of the method, UEs, and non-transitory computer-readable medium described herein, transmitting the one or more uplink messages may include operations, features, means, or instructions for transmitting the one or more uplink messages using the one or more full duplex slots in accordance with the at least one configuration.

In some examples of the method, UEs, and non-transitory computer-readable medium described herein, refrain from transmitting during the one or more half duplex slots based on the at least one configuration only applying to the one or more full duplex slots.

In some examples of the method, UEs, and non-transitory computer-readable medium described herein, receiving the control signaling indicating that the at least one configuration may include operations, features, means, or instructions for receiving the control signaling indicating a first configuration that applies to the one or more half duplex slots and a second configuration that applies to the one or more full duplex slots, where transmitting the one or more uplink messages includes, transmitting a first set of uplink messages using the one or more half duplex slots in accordance with the grant and the first configuration, and transmitting a second set of uplink messages using the one or more full duplex slots in accordance with the grant and the second configuration.

In some examples of the method, UEs, and non-transitory computer-readable medium described herein, the one or more parameters includes a first beam direction and a first beam width associated with the one or more half duplex slots and the one or more parameters includes a second beam direction and a second beam width associated with the one or more full duplex slots.

In some examples of the method, UEs, and non-transitory computer-readable medium described herein, transmitting the one or more uplink messages may include operations, features, means, or instructions for transmitting a first set of uplink messages using the one or more half duplex slots in accordance with the first beam direction and the first beam width and transmitting a second set of uplink messages using the one or more full duplex slots in accordance with the second beam direction and the second beam width.

In some examples of the method, UEs, and non-transitory computer-readable medium described herein, the control signaling includes a first bit value that indicates the first beam direction and the first beam width associated with the one or more half duplex slots, and comprises a second bit value that indicates the second beam direction and the second beam width associated with the one or more full duplex slots.

In some examples of the method, UEs, and non-transitory computer-readable medium described herein, the first bit value and the second bit value may be a same bit value.

In some examples of the method, UEs, and non-transitory computer-readable medium described herein, the one or more parameters include a first sounding reference signal resource indicator value and a first transmit precoding matrix index value for the one or more half duplex slots and the one or more parameters include a second sounding reference signal resource indicator value and a second transmit precoding matrix value for the one or more full duplex slots.

In some examples of the method, UEs, and non-transitory computer-readable medium described herein, transmitting one or more uplink messages may include operations, features, means, or instructions for transmitting a first set of uplink messages using the one or more half duplex slots in accordance with the first sounding reference signal resource indicator value and the first transmit precoding matrix index value and transmitting a second set of uplink messages using the one or more full duplex slots in accordance with the second sounding reference signal resource indicator value and the second transmit precoding matrix value.

Some examples of the method, UEs, and non-transitory computer-readable medium described herein may further include operations, features, means, or instructions for receiving an activation control signaling indicating a beam direction and a beam width, where the at least one configuration indicates that the beam direction and the beam width apply to the one or more full duplex slots, the one or more half duplex slots, or both.

In some examples of the method, UEs, and non-transitory computer-readable medium described herein, the at least one configuration includes a bit value that indicates the one or more parameters, the one or more parameters including a first beam direction and a first beam width for the one or more half duplex slots and the bit value maps to a second beam direction and a second beam width for the one or more full duplex slots.

In some examples of the method, UEs, and non-transitory computer-readable medium described herein, the at least one configuration includes a bit value that indicates the one or more parameters, the one or more parameters including a first beam direction and a first beam width for the one or more full duplex slots and the bit value maps to a second beam direction and a second beam width associated with the one or more parameters corresponding to the one or more half duplex slots.

A method for wireless communications by a network entity is described. The method may include transmitting, to a UE, a grant indicating a set of multiple resources allocated to the UE for uplink transmission, where the set of multiple resources includes one or more half duplex slots and one or more full duplex slots, transmitting, to the UE, control signaling indicating at least one configuration associated with the one or more half duplex slots, the one or more full duplex slots, or both, where the at least one configuration indicates one or more parameters corresponding to the one or more half duplex slots, the one or more full duplex slots, or both, and monitoring for one or more uplink messages according to the grant and the control signaling.

A network entity for wireless communications is described. The network entity may include one or more memories storing processor executable code, and one or more processors coupled with the one or more memories. The one or more processors may individually or collectively operable to execute the code to cause the network entity to transmit, to a UE, a grant indicating a set of multiple resources allocated to the UE for uplink transmission, where the set of multiple resources include one or more half duplex slots and one or more full duplex slots, transmit, to the UE, control signaling indicating at least one configuration associated with the one or more half duplex slots, the one or more full duplex slots, or both, where the at least one configuration indicates one or more parameters corresponding to the one or more half duplex slots, the one or more full duplex slots, or both, and monitor for one or more uplink messages according to the grant and the control signaling.

Another network entity for wireless communications is described. The network entity may include means for transmitting, to a UE, a grant indicating a set of multiple resources allocated to the UE for uplink transmission, means for where the set of multiple resources includes one or more half duplex slots and one or more full duplex slots, means for transmitting, to the UE, control signaling indicating at least one configuration associated with the one or more half duplex slots, the one or more full duplex slots, or both, means for where the at least one configuration indicates one or more parameters corresponding to the one or more half duplex slots, the one or more full duplex slots, or both, and means for monitoring for one or more uplink messages according to the grant and the control signaling.

A non-transitory computer-readable medium storing code for wireless communications is described. The code may include instructions executable by a processor to transmit, to a UE, a grant indicating a set of multiple resources allocated to the UE for uplink transmission, where the set of multiple resources include one or more half duplex slots and one or more full duplex slots, transmit, to the UE, control signaling indicating at least one configuration associated with the one or more half duplex slots, the one or more full duplex slots, or both, where the at least one configuration indicates one or more parameters corresponding to the one or more half duplex slots, the one or more full duplex slots, or both, and monitor for one or more uplink messages according to the grant and the control signaling.

Some examples of the method, network entities, and non-transitory computer-readable medium described herein may further include operations, features, means, or instructions for receiving an indication of a full duplexing capability associated with the UE, where the control signaling may be based on the indication.

In some examples of the method, network entities, and non-transitory computer-readable medium described herein, monitoring for the one or more uplink messages may include operations, features, means, or instructions for monitoring for the one or more uplink messages over the one or more half duplex slots in accordance with the at least one configuration.

In some examples of the method, network entities, and non-transitory computer-readable medium described herein, monitoring for one or more uplink messages may include operations, features, means, or instructions for monitoring for the one or more uplink messages over the one or more full duplex slots in accordance with the at least one configuration.

In some examples of the method, network entities, and non-transitory computer-readable medium described herein, transmitting the control signaling indicating the at least one configuration may include operations, features, means, or instructions for transmitting the control signaling indicating a first configuration that applies to the one or more half duplex slots and a second configuration that applies to the one or more full duplex slots, where monitoring for the one or more uplink messages includes, monitoring for a first set of uplink messages over the one or more half duplex slots in accordance with the grant and the first configuration, and monitoring for a second set of uplink messages over the one or more full duplex slots in accordance with the grant and the second configuration.

In some examples of the method, network entities, and non-transitory computer-readable medium described herein, the one or more parameters includes a first beam direction and a first beam width associated with the one or more half duplex slots, and the one or more parameters includes a second beam direction and a second beam width associated with the one or more full duplex slots.

In some examples of the method, network entities, and non-transitory computer-readable medium described herein, monitoring for the one or more uplink messages may include operations, features, means, or instructions for monitoring for a first set of uplink messages over the one or more half duplex slots in accordance with the first beam direction and the first beam width and monitoring for a second set of uplink messages using the one or more full duplex slots in accordance with the second beam direction and the second beam width.

In some examples of the method, network entities, and non-transitory computer-readable medium described herein, the control signaling includes a first bit value that indicates the first beam direction and the first beam width associated with the one or more half duplex slots, and comprises a second bit value that indicates the second beam direction and the second beam width associated with the one or more full duplex slots.

In some examples of the method, network entities, and non-transitory computer-readable medium described herein, the one or more parameters include a first sounding reference signal resource indicator value and a first transmit precoding matrix index value for the one or more half duplex slots and the one or more parameters include a second sounding reference signal resource indicator value and a second transmit precoding matrix value for the one or more full duplex slots.

In some examples of the method, network entities, and non-transitory computer-readable medium described herein, monitoring for the one or more uplink messages may include operations, features, means, or instructions for monitoring for a first set of uplink messages using the one or more half duplex slots in accordance with the first sounding reference signal resource indicator value and the first transmit precoding matrix index value and monitoring for a second set of uplink messages using the one or more full duplex slots in accordance with the second sounding reference signal resource indicator value and the second transmit precoding matrix value

DETAILED DESCRIPTION

Figure 1:
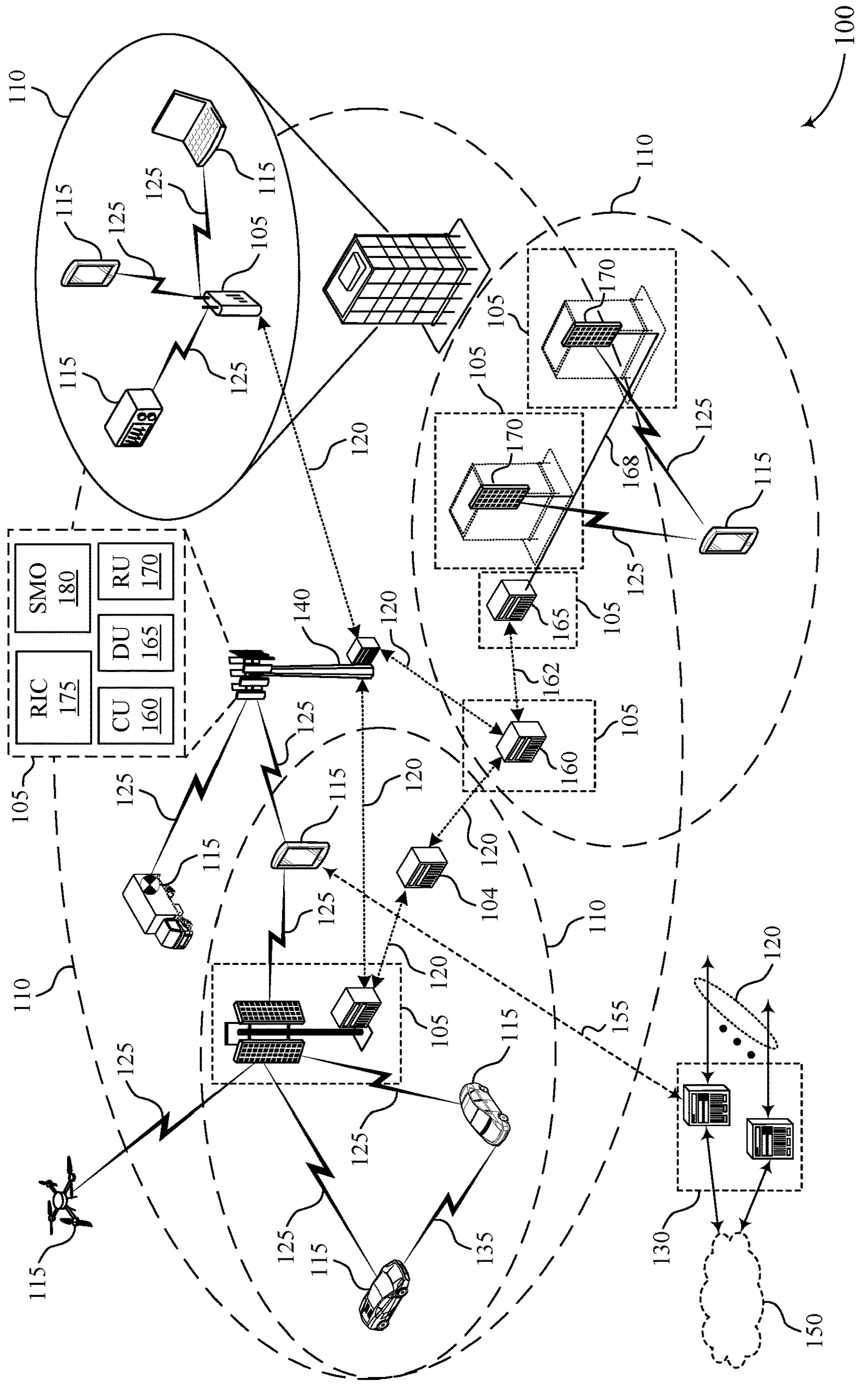
FIG. 1 shows an example of a wireless communications system that supports uplink (UL) configured grant of full duplex capable user equipment (UE) in accordance with one or more aspects of the present disclosure.

In some cases, a user equipment (UE) may be capable of full duplex communication. For instance, a UE may operate in an in-band full duplex (IBFD) where the UE may transmit and receive on the same time and frequency resources. That is, there may be at least a partial overlap in IBFD time and frequency resources for uplink transmissions and downlink transmissions. In another instance, the UE may operate in a sub-band frequency division duplex (FDD) (e.g., a flexible duplex, sub-band full duplex (SBFD)), where the UE may transmit and receive at the same time but on different frequency resources. A guard band may separate the downlink resources from the uplink resources in the frequency domain (e.g., the downlink resources and the uplink resources may still overlap in time resources).

Additionally, a UE may receive a configured grant from a network entity. The configured grant may be defined by time and frequency resources. The full-duplex capable UE may operate in half duplex mode (e.g., all of the antennas corresponding to the UE may be used for transmission) or a full duplex mode (e.g., some of the antennas corresponding to the UE may be used for transmission). However, a single configured grant may cover both half duplex slots and full duplex slots. Thus, the UE may operate with two modes of operations (e.g., a half duplex mode and a full duplex mode), where each mode utilizes a different quantity of antennas. As such, the UE may not know the necessary transmission parameters (e.g., a different set of transmission parameters for each transmission mode) and UE may transmit uplink message using an inefficient quantity of antennas, leading to increased latency and power usage. Further, the UE may not be able to efficiently communicate (e.g., efficiently use communication resources) in a full band mode.

In some cases, a UE may operate in both a half duplex mode and a full duplex mode. For example, an uplink configured grant may include at least one configuration for the half duplex mode (e.g., resources in one or more half duplex slots), the full duplex mode (e.g., resources in one or more full duplex slots), or both. The at least one configuration may include parameters corresponding to the one or more half duplex slots, the one or more full duplex slots, or both. Thus, the UE may be able to transmit messages during the one or more half duplex slots, the one or more full duplex slots, or both in an efficient manner (e.g., efficiently use communication resources).

In some cases, the at least one configuration may correspond to only the half duplex mode or the full duplex mode. In these instances, the UE may transmit in the mode corresponding to the at least one configuration. Additionally, or alternatively, the UE may transmit in the mode corresponding to the at least one configuration and drop occasions (e.g., refrain from transmitting during slots) corresponding to the other mode. In some other cases, the UE may apply the parameters for a configuration corresponding to a full duplex mode during half duplex slots. Additionally, or alternatively, the UE may receive at least two different configurations, where each configuration may correspond to a particular mode (e.g., a first configuration associated with the one or more half duplex slots and a second configuration associated with the one or more full duplex slots). Thus, the UE may receive parameters that are tailored (e.g., by a network entity) to the specific full duplex capable UE, allowing the UE to more efficiently use communication resources.

In some cases, the UE may receive an activation downlink control information (DCI) including one or more parameters (e.g., SRI, transmit precoding matrix indicator (TPMI), etc.) associated with the at least one configuration. Further, the UE may be configured with separate values indicating the respective parameters for each duplexing mode or with a single value indicating the respective parameters for each duplexing mode. Additionally, or alternatively, the UE may receive an indication of whether the values indicating the respective parameters correspond to a half duplex mode, a full duplex mode, or both. Thus, the UE may know whether to implement the one or more parameters, indicated by the at least one configuration, to the one or more half duplex slots, the one or more full duplex slots, or both.

Aspects of the disclosure are initially described in the context of wireless communications systems. Aspects of the disclosure are further illustrated by and described with reference to apparatus diagrams, system diagrams, process flows, and flowcharts that relate to an UL configured grant of full duplex capable UE.

FIG. 1 shows an example of a wireless communications system 100 that supports UL configured grant of full duplex capable UE in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support UL configured grant of full duplex capable UE as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a UE 115 may be capable of full duplex communication. For instance, a UE 115 may operate in a IBFD where the UE 115 may transmit and receive on the same time and frequency resources. That is, there may be at least a partial overlap in IBFD time and frequency resources for uplink transmissions and downlink transmissions. In another instance, the UE 115 may operate in a sub-band FDD (e.g., a flexible duplex), where the UE 115 may transmit and receive at the same time but using different frequency resources. A guard band may separate the downlink resources from the uplink resources in the frequency domain (e.g., the downlink resources and the uplink resources may still overlap in time resources).

Additionally, a UE 115 may receive a configured grant from a network entity 105. A configured grant may be defined by time and frequency resources. The full-duplex capable UE 115 may operate in half duplex mode (e.g., all of the antennas corresponding to the UE 115 may be used for transmission) or a full duplex mode (e.g., some of the antennas corresponding to the UE 115 may be used for transmission). However, a single configured grant may cover both half duplex slots and full duplex slots. Thus, the UE 115 may operate with two modes of operations (e.g., a half duplex mode and a full duplex mode), where each mode utilizes a different quantity of antennas. As such, the UE 115 may require multiple transmission parameters (e.g., a different set of transmission parameters for each transmission mode). The transmission parameters may include at least a SRI and an indication of precoding or quantity of layers.

In some cases, a UE 115 may be an SBFD capable UE 115. The SBFD capable UE 115 may include particular components (e.g., knobs) or requirements for SBFD communications. For example, an SBFD capable UE 115 may include separate antennas (e.g., panels) for transmission (Tx) and reception (Rx). Additionally, or alternatively, the SBFD capable UE 115 may include a shared antenna (e.g., a single antenna for both Tx and Rx) with an enhanced (e.g., improved) circulator and/or duplexer design. Thus, the SBFD capable UE 115 may have improved spatial isolation. In another example, an SBFD capable UE 115 may include a Tx/Rx analog filter (e.g., a duplexer) for improved frequency isolation. Additionally, or alternatively, the SBFD capable UE 115 may include any combination of an analog interference canceller, a Rx filter, or a digital non-linear (NL) interference canceller (e.g., a kernel gen from Tx samples or feedback receiver (FBRX) to capture post-power amplifier (PA) non-linearity). Additionally, or alternatively, the SBFD capable UE 115 may include a blocker component which may decrease the maximum input RF power.

In some cases, a UE 115 may receive one or more configured grants from a network entity 105. Configured grants may define a set of time and frequency resources allocated to the UE for transmission, reception, or both. Additionally, or alternatively, configured grants may indicate a periodicity and/or repetition, among other configurations, for the set of time and frequency resources allocated to the UE. In some instances, a configured grant may include (e.g., require) a DCI activation. In some other instances, a configured grant may not include any DCI activation. In either of these instances, a configured grant may be given a modulation coding scheme (MCS) value. A UE 115 may be configured with multiple (e.g., up to twelve) UL configured grants.

In some cases, a UE 115 may operate in both a half duplex mode and a full duplex mode. For example, an UL configured grant may include at least one configuration for the half duplex mode (e.g., one or more parameters for communicating via resources in one or more half duplex slots), the full duplex mode (e.g., one or more parameters for communicating via resources in one or more full duplex slots), or both. For instance, the at least one configuration may correspond to only the half duplex mode or the full duplex mode. In these instances, the UE 115 may transmit in the mode corresponding to the at least one configuration. Additionally, or alternatively, the UE 115 may transmit in the mode corresponding to the at least one configuration and drop occasions (e.g., refrain from transmitting during slots) corresponding to the other mode. In some other cases, the UE 115 may apply the parameters for a configuration corresponding a full duplex mode during half duplex slots. Additionally, or alternatively, the UE 115 may receive at least two different configurations, where each configuration may correspond to a particular mode (e.g., a first configuration associated with the one or more half duplex slots and a second configuration associated with the one or more full duplex slots).

In some cases, the UE 115 may receive, from the network entity 105, an activation DCI including one or more parameters (e.g., SRI, TPMI, etc.) associated with the at least one configuration. Further, the UE 115 may be configured with separate values indicating the respective parameters for each duplexing mode or with a single value indicating the respective parameters for each duplexing mode. Additionally, or alternatively, the UE may receive an indication of whether the values indicating the respective parameters correspond to a half duplex mode, a full duplex mode, or both.

Figure 2:
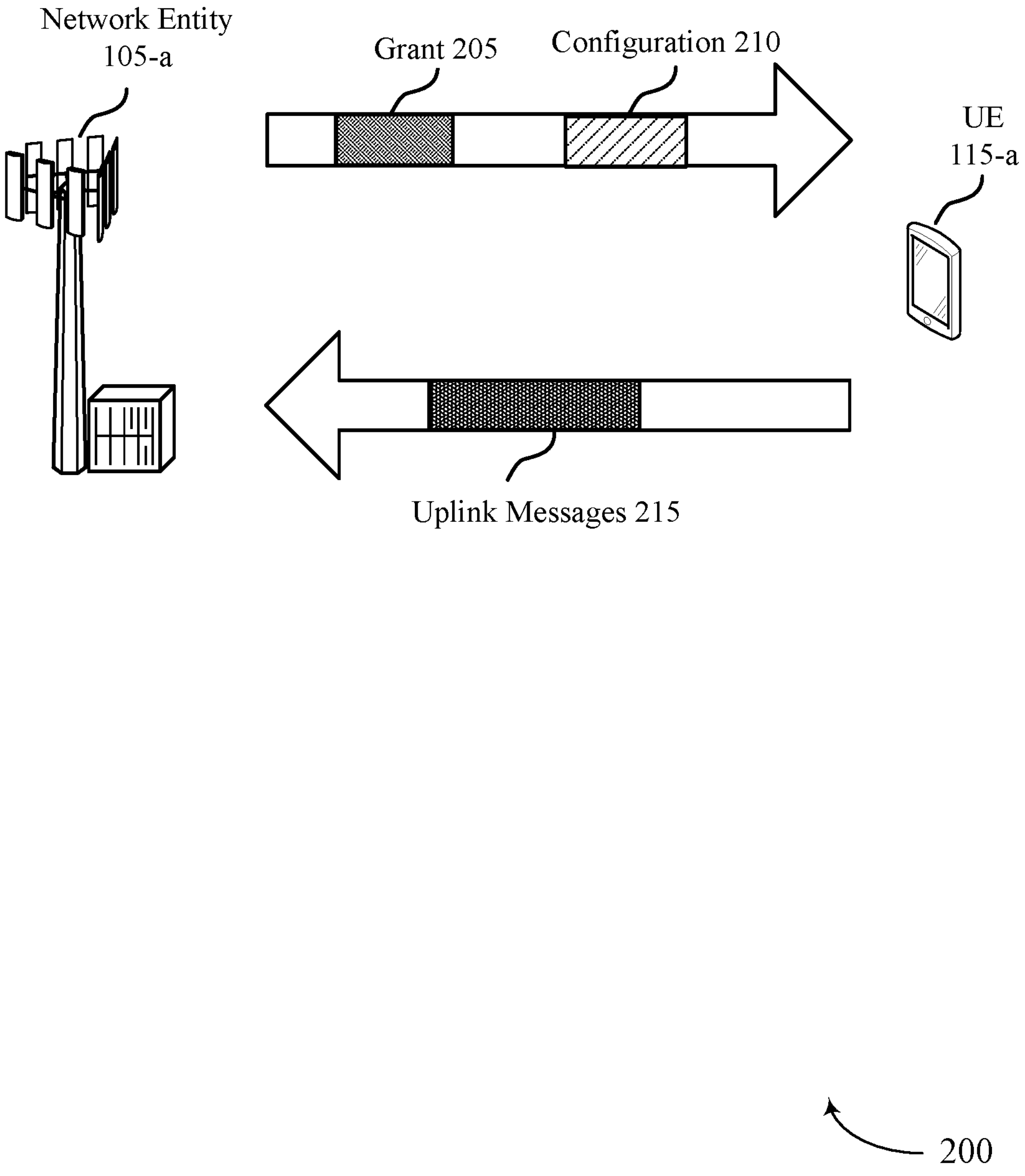
FIG. 2 shows an example of a wireless communications system that supports UL configured grant of full duplex capable UE in accordance with one or more aspects of the present disclosure.

FIG. 2 shows an example of a wireless communications system 200 that supports an UL configured grant of full duplex capable UE in accordance with one or more aspects of the present disclosure. The wireless communications system 200 may implement, or be implemented by, aspects of the wireless communications system 100. For example, the wireless communications system may include a network entity 105-*a* and a UE 115-*a*, which may be examples of a network entity 105 and a UE 115, respectively, as described with reference to FIG. 1.

The wireless communications system 200 may support SBFD communication between the UE 115-*a* and the network entity 105-*a*. For example, the UE 115-*a* may be a full-duplex capable UE. For instance, the UE 115-*a* may operate in a half duplex mode, where the UE 115-*a* may use all of its antennas for transmission. Additionally, or alternatively, the UE 115-*a* may operate in a full duplex mode, where the UE 115-*a* may use a portion of its antennas for transmission. However, each respective mode of operation may be associated with a different quantity of antennas and different transmission parameters (e.g., a SRI, precoding, a quantity of layers, etc.). That is, the transmission parameters may be different depending on the respective transmission mode. Thus, the UE 115-*a* may benefit from a configured grant with updated MIMO parameters tailored to the full-duplex capable UE 115.

In some cases, the UE 115-*a* may receive a grant 205 from the network entity 105-*a*. The grant may indicate one or more resources allocated to the UE 115-*a* for uplink transmission (e.g., transmitting uplink messages). The one or more resources may include one or more half duplex slots, one or more full duplex slots, or both.

In some cases, the UE 115-*a* may receive control signaling indicating a configuration 210 from the network entity 105-*a*. The configuration 210 may be one or more configurations 210 (e.g., two or more different configurations). The configuration 210 may be associated with the one or more half duplex slots, the one or more full duplex slots, or both. The configuration 210 may indicate one or more parameters (e.g., time domain offset, time domain allocation, frequency domain allocation, antenna port, demodulation reference signal (DMRS) sequence initialization, precoding and number of layers indicator, SRI, MCS and transport block size (TBS) indicator, frequency hopping offset, pathloss reference index, physical uplink shared channel (PUSCH) repetition type, time reference SFN corresponding to the one or more half duplex slots, the one or more full duplex slots, or both.

In some cases, the UE 115-*a* may transmit one or more uplink messages 215 to the network entity 105-*a*. For example, the UE 115-*a* may transmit the one or more uplink messages 215 according to the parameters specified by the configuration 210 and the grant 205.

Figure 3A:
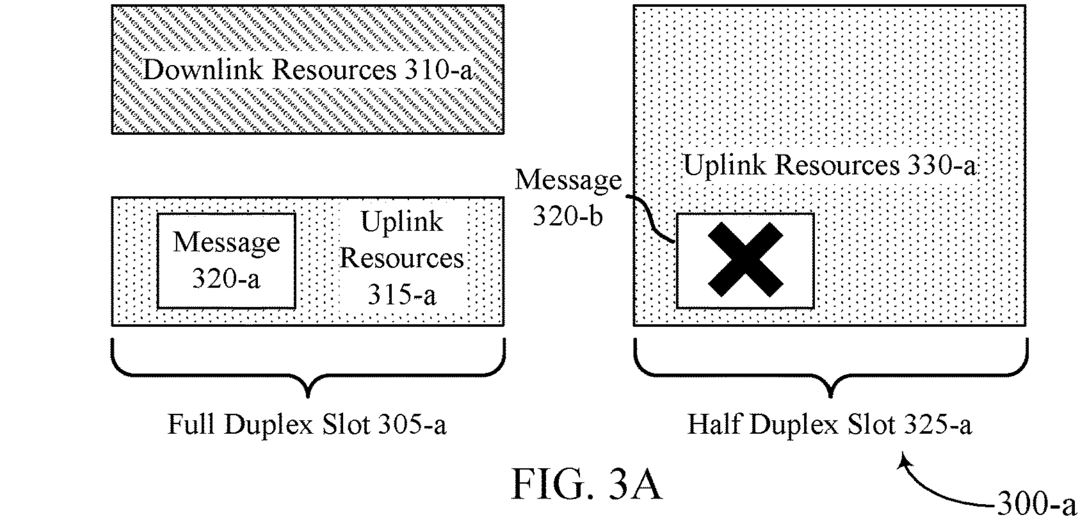
FIGS. 3A, 3B, and 3C show examples of a wireless communications system that supports UL configured grant of full duplex capable UE in accordance with one or more aspects of the present disclosure.
Figure 3B:
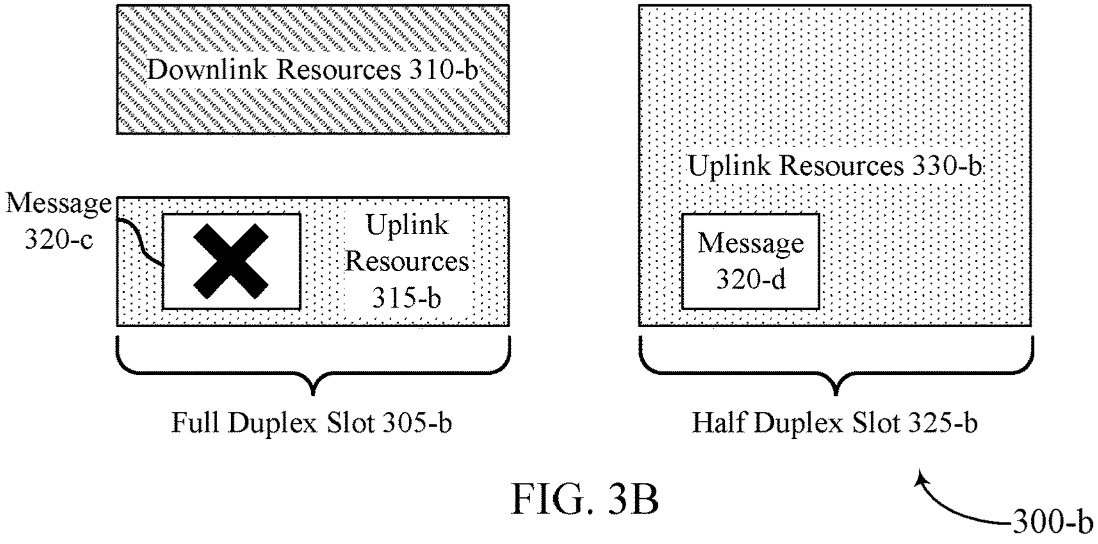
Figure 3C:
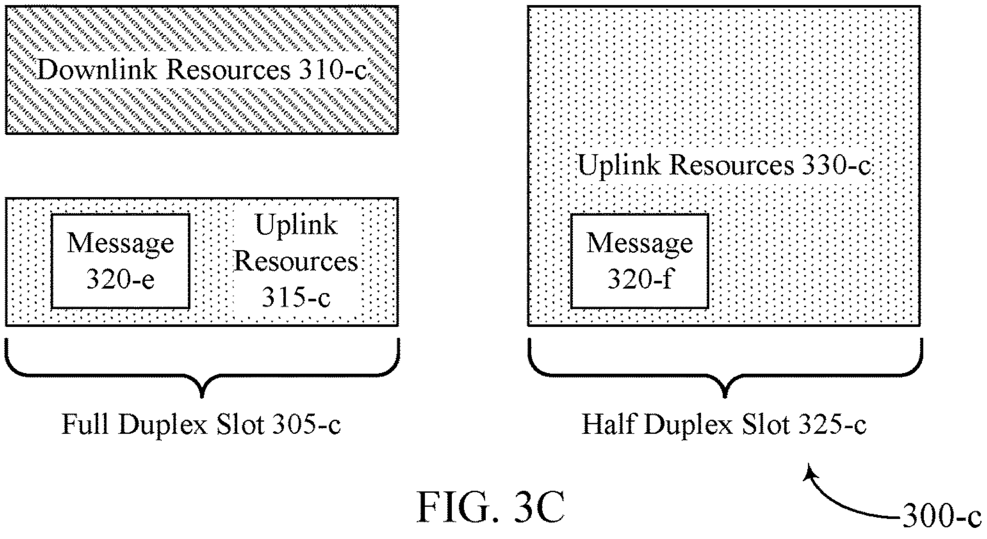

FIGS. 3A, 3B, and 3C illustrate examples of wireless communications systems 300-*a*, 300-*b*, and 300-*c* that support UL configured grant of full duplex capable UE in accordance with one or more aspects of the present disclosure. In some examples, the wireless communications systems 300-*a*, 300-*b*, and 300-*c* may implement or be implemented by aspects of the wireless communications system 100 and the wireless communications system 200.

In some cases, a network entity (e.g., a network entity 105-*a* as described with reference to FIG. 2) may allocate one or more resources (e.g., downlink resources 310, uplink resources 315, and uplink resources 330), to a UE (e.g., a UE 115-*a* as described with reference to FIG. 2), across one or more full duplex slots 305 and one or more half duplex slots 325. For example, a full duplex slot 305 may include both downlink resources 310 and uplink resources 315, while a half duplex slot 325 may include only uplink resources 330.

In some cases, the UE may receive control signaling indicating at least one configuration (e.g., the configuration 210 as described with reference to FIG. 2) associated with the one or more full duplex slots 305, the one or more half duplex slots 325, or both. The configuration may indicate one or more parameters corresponding to the one or more full duplex slots 305, the one or more half duplex slots 325, or both. The UE may transmit one or more messages 320 (e.g., uplink messages) using the one or more full duplex slots 305, the one or more half duplex slots 325, or both according to the configuration.

As illustrated in FIG. 3A, a UE (e.g., a full duplex capable UE) may receive a grant allocating the UE with a full duplex slot 305-*a* including downlink resources 310-*a* and uplink resources 315-*a*. The UE may also be allocated with a half duplex slot 325-*a* including uplink resources 330-*a*. The UE may receive control signaling indicating a configuration that corresponds to one or more full duplex slots 305. In other words, the UE may be configured with an UL configured grant, such that the configuration only applies to a full duplex mode of operation. In some instances, the UE may be configured to use 2 Tx antennas by the configured grant. Thus, the UE may drop transmission within any occasion that falls within the half duplex slot 325-*a* (e.g., because the configuration only applies to a full duplex mode of operation, and thus the UE skips transmitting any half duplex slots). As an illustrative example, a network entity may transmit a configured grant that allocates an occasion for the UE to transmit during the full duplex slot 305-*a* and an occasion to transmit during the half duplex slot 325-*a*. The UE may transmit the message 320-*a* using the full duplex slot 305-*a* according to the configuration. Additionally, or alternatively, the UE may refrain from transmitting the message 320-*b* during the half duplex slot 325-*a* based on the configuration only applying to the full duplex slot 305-*a*. Although shown as a particular quantity of full duplex slots 305, half duplex slots 325, and messages 320 for illustrative purposes, the UL configured grant may apply to any quantity or combination of full duplex slots 305, half duplex slots 325, or messages 320.

As illustrated in FIG. 3B, a UE (e.g., a full duplex capable UE) may receive a grant allocating the UE with a full duplex slot 305-*b* including downlink resources 310-*b* and uplink resources 315-*b*. The UE may also be allocated with a half duplex slot 325-*b* including uplink resources 330-*b*. The UE may receive control signaling indicating a configuration that corresponds to one or more half duplex slots 325-*b*. In other words, the UE may be configured with an UL configured grant, such that the configuration only applies to a half duplex mode of operation. In some instances, the UE may be configured to use 4 Tx antennas by the configured grant. Thus, the UE may drop any transmission within an occasion that falls in the full duplex slot 305-*b* (e.g., because the configuration only applies to a half duplex mode of operation). As an illustrative example, a network entity may transmit a configured grant that allocates an occasion for the UE to transmit during the full duplex slot 305-*b* and an occasion to transmit during the half duplex slot 325-*b*. The UE may transmit the message 320-*d* using the half duplex slot 325-*b* according to the configuration. Additionally, or alternatively, the UE may refrain from transmitting the message 320-*c* during the full duplex slot 305-*b* based on the configuration only applying to the half duplex slot 325-*b*. Although shown as a particular quantity of full duplex slots 305, half duplex slots 325, and messages 320 for illustrative purposes, the UL configured grant may apply to any quantity or combination of full duplex slots 305, half duplex slots 325, or messages 320.

As illustrated in FIG. 3C, a UE (e.g., a full duplex capable UE) may receive a grant allocating the UE with a full duplex slot 305-*c* including downlink resources 310-*c* and uplink resources 315-*c*. The UE may also be allocated with a half duplex slot 325-*c* including uplink resources 330-*c*. In some instances, a network entity may schedule the UE with an occasion to transmit a message 320-*e* during the full duplex slot 305-*c* and an occasion transmit a message 320-*f* during the half duplex slot 325-*c*.

In a first example, the UE may receive control signaling indicating one or more configurations that correspond to one or more full duplex slots 305. In some examples, if a configuration is for a full-duplex mode, the UE may apply one or more parameters of the full-duplex mode configuration even if a configured grant occasion falls with a half duplex slot. In some instances, the UE may apply a smaller number of antennas, than possible, in the half duplex slot. In some instances, the UE may be configured to use 2 Tx antennas by the control signaling in full duplex slots and the UE may also use 2 Tx antennas in the half duplex slot. The UE may apply the configurations (e.g., one or more parameters indicated by the full duplex configuration) to a configured grant occasion that fall within the half duplex slot 325-*a*. In these cases, the UE, may use a smaller quantity of antennas than possible. That is, the UE may apply the parameters indicated by the configuration for the full duplex slot 305-*c* for transmissions that occur within the half duplex slot 325-*c*. Thus, the UE may transmit the message 320-*e* using the full duplex slot 305-*c* according to the configuration. Additionally, or alternatively, the UE may transmit the message 320-*f* during the half duplex slot 325-*c* according to the configuration for the full duplex slot 305-*a*. Although shown as a particular quantity of full duplex slots 305, half duplex slots 325, and messages 320 for illustrative purposes, the UL configured grant may apply to any quantity or combination of full duplex slots 305, half duplex slots 325, or messages 320.

In a second example, the UE may receive control signaling indicating multiple configurations. That is, the configuration (e.g., at least one configuration) may contain two sets of configurations that may be applied to a corresponding transmission type. In other words, the UE may receive control signaling indicating a first configuration that applies to the half duplex slot 325-*c* and a second configuration that applies to the full duplex slot 305-*c*. The UE may apply the one or more parameters indicated by the first configuration for transmission of a message during the half duplex slot 325-*c* and apply the one or more parameters indicated by the second configuration for transmission of a message during the full duplex slot 305-*c*. Thus, the UE may transmit the message 320-*e* using the full duplex slot 305-*c* according to the second configuration. Additionally, or alternatively, the UE may transmit the message 320-*f* using the half duplex slot 325-*c* according to the first configuration. Although shown as a particular quantity of full duplex slots 305, half duplex slots 325, and messages 320 for illustrative purposes, the UL configured grant may apply to any quantity or combination of full duplex slots 305, half duplex slots 325, or messages 320.

Figure 4:
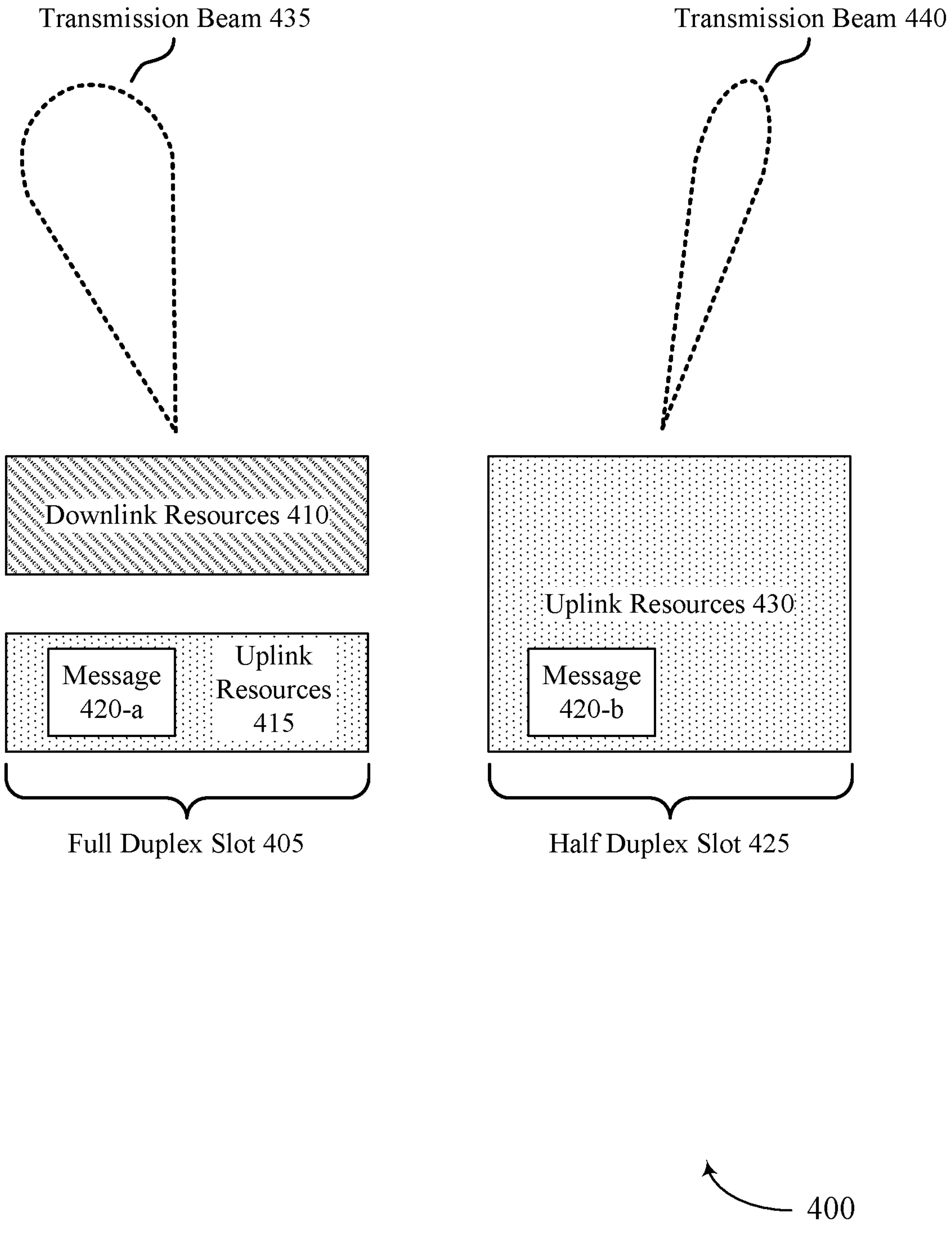
FIG. 4 shows an example of a wireless communications system that supports UL configured grant of full duplex capable UE in accordance with one or more aspects of the present disclosure.

FIG. 4 shows an example of a wireless communications system 400 that supports UL configured grant of full duplex capable UE in accordance with one or more aspects of the present disclosure. In some examples, the wireless communications system 400 may implement, or be implemented by, aspects of the wireless communications system 100, the wireless communications system 200, and the wireless communications system 300-*a* through 300-*c*.

In some cases, a network entity (e.g., a network entity 105-*a* as described with reference to FIG. 2) may allocate, via control signaling (e.g., a configured grant), one or more resources (e.g., one or more downlink resources 410, one or more uplink resources 415, and one or more uplink resources 430), to a UE (e.g., a UE 115-*a* as described with reference to FIG. 2), across one or more full duplex slots 405 and one or more half duplex slots 425. For example, a full duplex slot 405 may include both downlink resources 410 and uplink resources 415, while a half duplex slot 425 may include only uplink resources 430.

In some cases, a full duplex slot 405 may be associated with one or more transmission beams (e.g., a transmission beam 435), while the half duplex slot 425 may be associated with one or more transmission beams (e.g., a transmission beam 440). The transmission beam 435 may have a first beam direction and a first beam width associated with the full duplex slot 405. The transmission beam 440 may have a second beam direction and a second beam width associated with the half duplex slot 425. A network entity may schedule the UE with an occasion to transmit a message 420-*a* during the full duplex slot 405 and an occasion to transmit a message 420-*b* during the half duplex slot 425. Thus, the UE may transmit the message 420-*a* using the full duplex slot 405 through the transmission beam 435 (e.g., according to the first beam direction and the first beam width). Additionally, or alternatively, the UE may transmit the message 420-*b* using the half duplex slot 425 through the transmission beam 440 (e.g., according the second beam direction and the second beam width).

In some cases, the UE may receive control signaling indicating at least one configuration associated with the one or more full duplex slots 405 (e.g., when the UE is in a full duplex mode), the one or more half duplex slots 425 (e.g., when the UE is a half duplex mode), or both. The configuration may indicate one or more parameters corresponding to the one or more full duplex slots 405, the one or more half duplex slots 425, or both. The UE may transmit the one or more messages 420 (e.g., uplink messages) using the one or more full duplex slots 405, the one or more half duplex slots 425, or both according to the configuration.

In some cases, the one or more parameters may include a beam direction, a beam width, or both, among other examples. For instance, the parameters may include a SRI (e.g., srs-ResourceIndicator) and a TPMI. The UE may receive these parameters through RRC configuration (e.g., via control signaling, such as RRC signaling). Additionally, or alternatively, an activation DCI may indicate these parameters to the UE. In some instances, a full duplex UE may have two SRS resource sets, where each mode of operation (e.g., full duplex mode and half duplex mode) has a corresponding SRS resource set. Further, the TPMI, the SRI, or both may be different for each mode of operation. That is, the TPMI, the SRI, or both may be different for the full duplex slot 405 and the half duplex slot 425.

In some cases, the UE may receive control signaling indicating a configuration including a value for the beam direction and the beam width for each duplexing mode. For example, the UE may receive control signaling including a first bit value (e.g., corresponding to the transmission beam 435) that indicates the first beam direction and the first beam width associated with message transmission during the full duplex slot 405. Additionally, or alternatively, the UE may receive control signaling including a second bit value (e.g., corresponding to the transmission beam 440) that indicates the second beam direction and the second beam width associated with message transmission during the half duplex slot 425. In some instances, the first bit value and the second bit value may be a same bit value (e.g., one value of SRI and TPMI jointly indicates the SRI and the TPMI for both the half duplex mode and the full duplex mode) or a different bit value. In some cases, the configuration may specify a relationship between the SRI and the TPMI, such that the transmission beam 435 differs from the transmission beam 440 by a defined amount. For example, the control signaling may indicate the one bit value and the configuration indicates that the one bit value is for the transmission beam 435, and parameters for the transmission beam 440 are offset by a defined amount (e.g., SRI of first beam 435 is offset from the SRI of the second beam 440, the TPMI of first beam 440 is offset from the SRI of the second beam 440, etc.).

In some cases, s. For example, the one or more parameters may include a first SRI value and a first TPMI value for the full duplex slot 405 (e.g., the transmission beam 435). Additionally, or alternatively, the one or more parameters may include a second SRI value and a second TPMI value for the half duplex slot 425 (e.g., the transmission beam 440). The UE may transmit the message 420-*a* using the full duplex slot 405 (e.g., through the transmission beam 435) according to the first SRI value and the first TPMI value. Additionally, or alternatively, the UE may transmit the message 420-*b* using the half duplex slot 425 (e.g., through the transmission beam 440) according to the second SRI value and the second TPMI value. In some cases, the full duplex slot 405 may be associated with 2 Tx antennas, while the half duplex slot 425 may be associated with 4 Tx antennas.

In some cases, a UE may receive an activation control signaling (e.g., for a configured grant that is activated with DCI). In these cases, the DCI may include the SRI value and the TPMI value. That is, the activation DCI may indicate the beam direction and the beam width. However, the activation DCI may be able to signal only a single SRI value and a single TPMI value. Thus, the UE may not know whether to use the SRI value, the TPMI value, or both for the full duplex slot 405, the half duplex slot 425, or both.

In some cases, the UE may receive an activation control signaling including at least one configuration. The at least one configuration may indicate a beam direction and a beam width. Additionally, the at least one configuration may indicate that the beam direction and the beam width may apply to the full duplex slot, the half duplex slot 425, or both. In other words, the UL configured grant configuration may include one or more parameters that indicate whether the STI value and the TPMI value signaled in the activation DCI apply when the UE is in a half duplex mode, a full duplex mode, or both.

In some cases, at least one configuration may include a bit value that indicates the one or more parameters including a first beam direction and a first beam width for a given mode. That is, the UL configured grant configuration may include one or more parameters that indicate the SRI and the TPMI of a given mode. The UE may map the bit value to a second beam direction and a second beam width for the other mode. For example, the at least one configuration may include a bit value that indicates a first beam direction for the transmission beam 435 (e.g., the full duplex slot 405). The bit value may map to a second beam direction and a second beam width for the transmission beam 440 (e.g., the half duplex slot 425). In another example, the at least one configuration may include a bit value that indicates a first beam direction for the transmission beam 440 (e.g., the half duplex slot 425). The bit value may map to a second beam direction and a second beam width for the transmission beam 435 (e.g., the full duplex slot 405).

Figure 5:
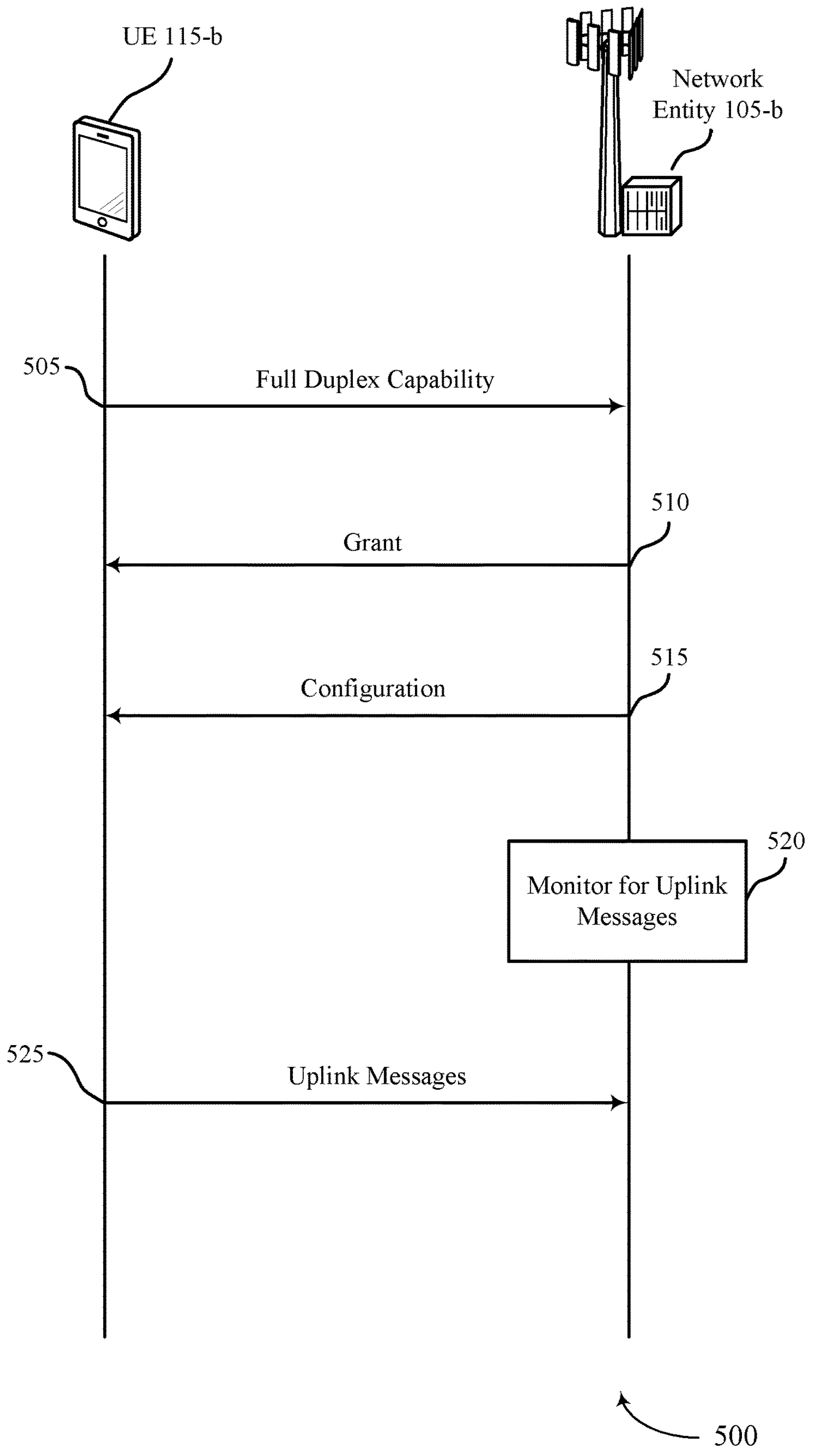
FIG. 5 shows an example of a process flow that supports UL configured grant of full duplex capable UE in accordance with one or more aspects of the present disclosure.

FIG. 5 shows an example of a process flow 500 that supports UL configured grant of full duplex capable UE in accordance with one or more aspects of the present disclosure. The process flow 500 may implement or be implemented to facilitate or realize aspects of the wireless communications system 100, the wireless communications system 200, the wireless communications system 300-*a* through 300-*b*, and the wireless communications system 400 described with reference to FIGS. 1 through 4. For example, the process flow 500 illustrates communications between a UE 115-*b* and a network entity 105-*b*, which may be examples of the UE 115-*a* and the network entity 105-*a*, respectively, as described with reference to FIG. 2. The process flow 500 may be implemented by the UE 115-*b* and the network entity 105-*b* to reduce latency and lower signaling overhead for a full duplex capable UE 115-*b*.

In the following description of the process flow 500, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 500, and other operations may be added to the process flow 500. Further, although some operations or signaling may be shown to occur at different times for discussion purposes, these operations may actually occur at the same time.

At 505, the UE 115-*b* may transmit an indication of a full duplex capability to the network entity 105-*b*. That is, the UE 115-*b* may be a full duplex capable UE 115-*b* and be able to transmit and receive over overlapping resources (e.g., time resources). The UE 115-*b* may transmit the indication of the full duplex capability according to a specific configuration. The UE 115-*b* may receive the specific configuration from the network entity 105-*b*. For example, the network entity 105-*b* may transmit a capability request to the UE 115-*b*.

At 510, the network entity 105-*b* may transmit a grant (e.g., a configured grant) to the UE 115-*b*. The grant may indicate one or more resources allocated to the UE 115-*b* for uplink transmission (e.g., for the UE 115-*b* to transmit one or more uplink messages). The one or more resources may include both one or more half duplex slots and one or more full duplex slots.

At 515, the network entity 105-*b* may transmit control signaling that includes at least one configuration to the UE 115-*b*. The at least one configuration may be associated with the one or more half duplex slots, the one or more full duplex slots, or both. Further, the at least one configuration may indicate one or more parameters (e.g., a SRI value, a TPMI value, or both) associated with the one or more half duplex slots, the one or more full duplex slots, or both.

At 520, the network entity 105-*b* may monitor for one or more uplink messages. For example, network entity 105-*b* may monitor for the one or more uplink messages, from the UE 115-*b*, according to the grant transmitted at 510 and the at least one configuration transmitted at 515. In some cases, the network entity 105-*b* may monitor for the one or more uplink messages over the one or more half duplex slots, the one or more full duplex slots, or both, according to the at least one configuration (e.g., the one or more parameters).

At 525, the UE 115-*b* may transmit one or more uplink messages. For example, the UE 115-*b* may transmit the one or more uplink messages, to the network entity 105-*b*, according to the grant received at 510 and the at least one configuration received at 515. In some cases, the UE 115-*b* may transmit the one or more uplink messages using the one or more half duplex slots, the one or more full duplex slots, or both, according to the at least one configuration (e.g., the one or more parameters). Additionally, or alternatively, the UE 115-*b* may refrain from transmitting during the one or more full duplex slots, the one or more half duplex slots, or both at 530. For instance, the UE 115-*b* may refrain from transmitting during the one or more full duplex slots based on the at least one configuration only applying to the one or more half duplex slots. Similarly, the UE 115-*b* may refrain from transmitting during the one or more half duplex slots based on the at least one configuration only applying to the one or more full duplex slots.

Figure 6:
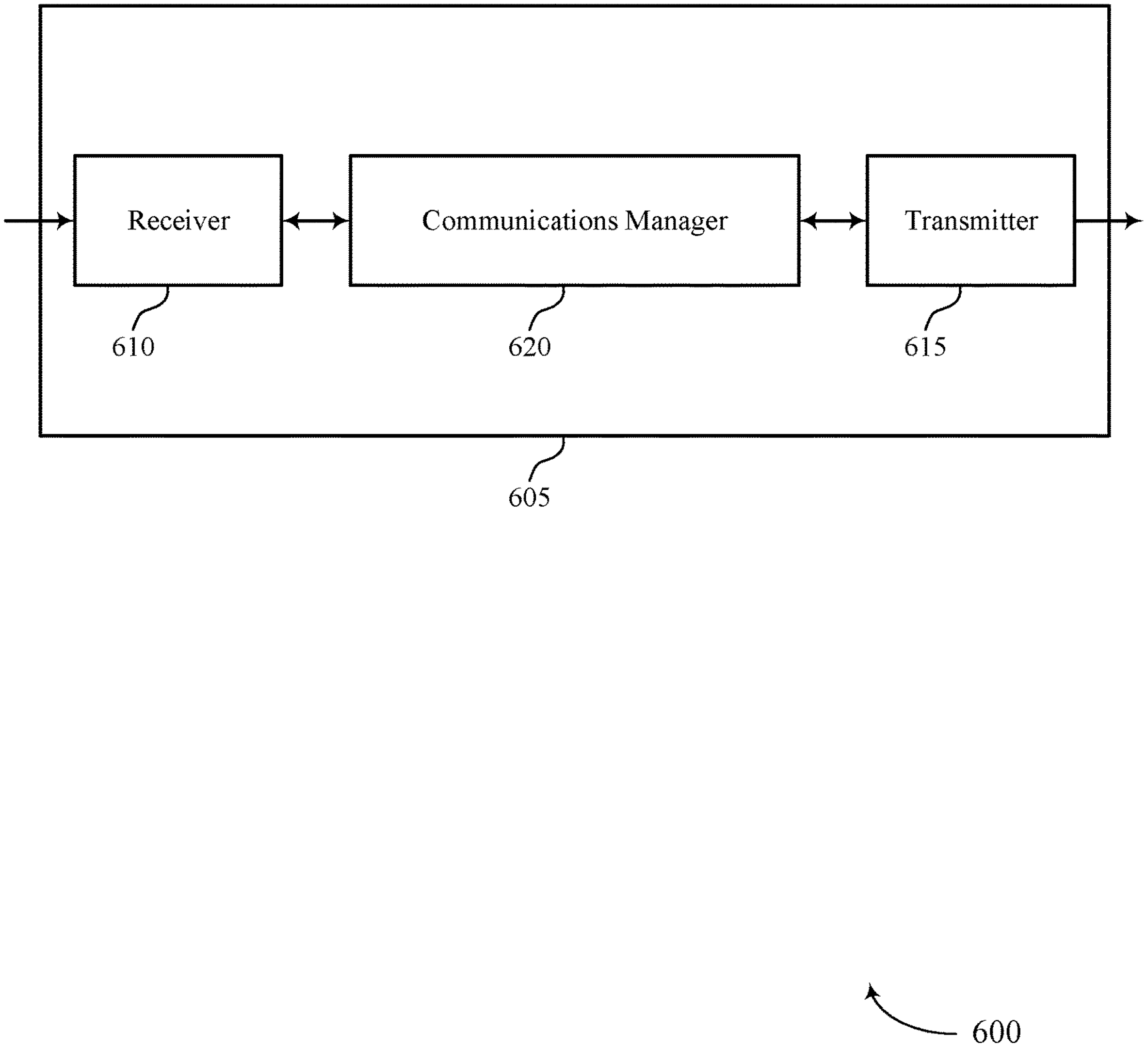
FIGS. 6 and 7 show block diagrams of devices that support UL configured grant of full duplex capable UE in accordance with one or more aspects of the present disclosure.

FIG. 6 shows a block diagram 600 of a device 605 that supports UL configured grant of full duplex capable UE in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to UL configured grant of full duplex capable UE). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UL configured grant of full duplex capable UE). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of UL configured grant of full duplex capable UE as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving a grant indicating a set of multiple resources allocated to the UE for uplink transmission. The communications manager 620 is capable of, configured to, or operable to support a means for where the set of multiple resources including one or more half duplex slots and one or more full duplex slots. The communications manager 620 is capable of, configured to, or operable to support a means for receiving control signaling indicating at least one configuration associated with the one or more half duplex slots, the one or more full duplex slots, or both. The communications manager 620 is capable of, configured to, or operable to support a means for where the at least one configuration indicating one or more parameters corresponding to the one or more half duplex slots, the one or more full duplex slots, or both. The communications manager 620 is capable of, configured to, or operable to support a means for transmitting one or more uplink messages in accordance with the grant and the control signaling.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for more efficient utilization of communication resources.

Figure 7:
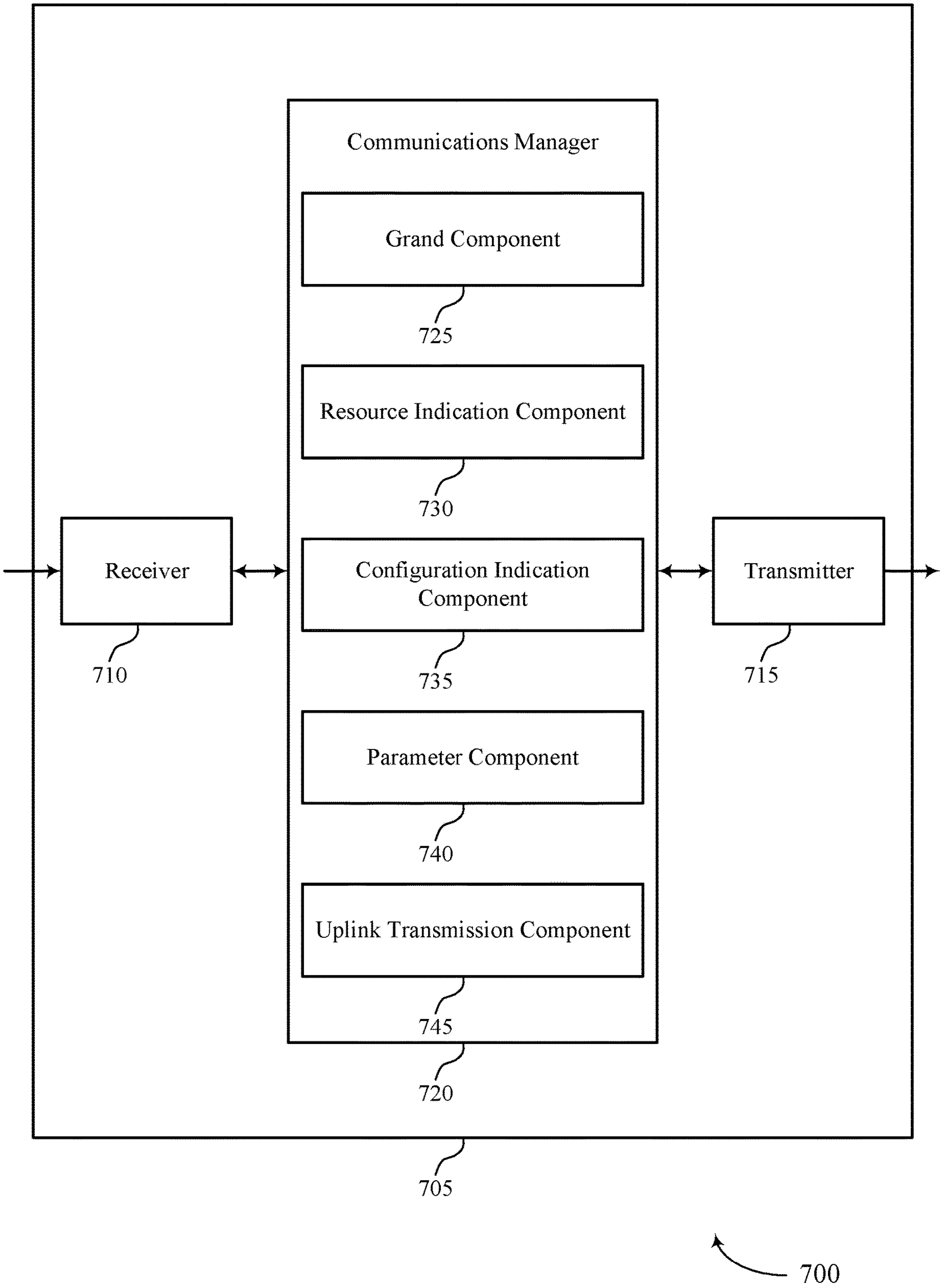

FIG. 7 shows a block diagram 700 of a device 705 that supports UL configured grant of full duplex capable UE in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to UL configured grant of full duplex capable UE). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to UL configured grant of full duplex capable UE). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of UL configured grant of full duplex capable UE as described herein. For example, the communications manager 720 may include a grand component 725, a resource indication component 730, a configuration indication component 735, a parameter component 740, an uplink transmission component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The grand component 725 is capable of, configured to, or operable to support a means for receiving a grant indicating a set of multiple resources allocated to the UE for uplink transmission. The resource indication component 730 is capable of, configured to, or operable to support a means for where the set of multiple resources includes one or more half duplex slots and one or more full duplex slots. The configuration indication component 735 is capable of, configured to, or operable to support a means for receiving control signaling indicating at least one configuration associated with the one or more half duplex slots, the one or more full duplex slots, or both. The parameter component 740 is capable of, configured to, or operable to support a means for where the at least one configuration indicates one or more parameters corresponding to the one or more half duplex slots, the one or more full duplex slots, or both. The uplink transmission component 745 is capable of, configured to, or operable to support a means for transmitting one or more uplink messages in accordance with the grant and the control signaling.

Figure 8:
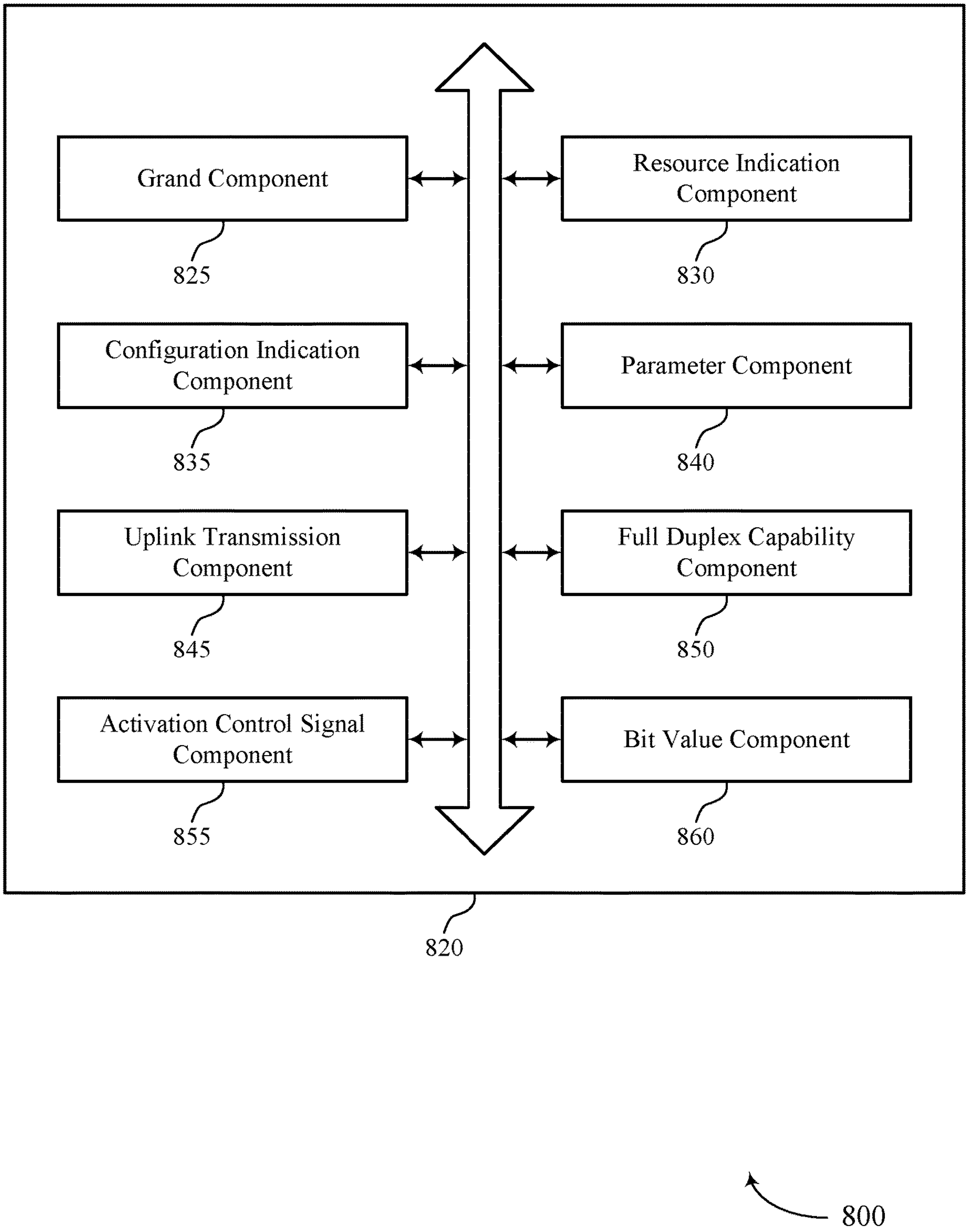
FIG. 8 shows a block diagram of a communications manager that supports UL configured grant of full duplex capable UE in accordance with one or more aspects of the present disclosure.

FIG. 8 shows a block diagram 800 of a communications manager 820 that supports UL configured grant of full duplex capable UE in accordance with one or more aspects of the present disclosure. The communications manager 820 may be an example of aspects of a communications manager 620, a communications manager 720, or both, as described herein. The communications manager 820, or various components thereof, may be an example of means for performing various aspects of UL configured grant of full duplex capable UE as described herein. For example, the communications manager 820 may include a grand component 825, a resource indication component 830, a configuration indication component 835, a parameter component 840, an uplink transmission component 845, a full duplex capability component 850, an activation control signal component 855, a bit value component 860, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The grand component 825 is capable of, configured to, or operable to support a means for receiving a grant indicating a set of multiple resources allocated to the UE for uplink transmission. The resource indication component 830 is capable of, configured to, or operable to support a means for where the set of multiple resources includes one or more half duplex slots and one or more full duplex slots. The configuration indication component 835 is capable of, configured to, or operable to support a means for receiving control signaling indicating at least one configuration associated with the one or more half duplex slots, the one or more full duplex slots, or both. The parameter component 840 is capable of, configured to, or operable to support a means for where the at least one configuration indicates one or more parameters corresponding to the one or more half duplex slots, the one or more full duplex slots, or both. The uplink transmission component 845 is capable of, configured to, or operable to support a means for transmitting one or more uplink messages in accordance with the grant and the control signaling.

In some examples, the full duplex capability component 850 is capable of, configured to, or operable to support a means for transmitting an indication of a full duplexing capability associated with the UE. In some examples, the full duplex capability component 850 is capable of, configured to, or operable to support a means for where the control signaling is based on the indication.

In some examples, to support transmitting the one or more uplink messages, the uplink transmission component 845 is capable of, configured to, or operable to support a means for transmitting the one or more uplink messages using the one or more half duplex slots in accordance with the at least one configuration.

In some examples, the uplink transmission component 845 is capable of, configured to, or operable to support a means for refraining from transmitting during the one or more full duplex slots based on the at least one configuration only applying to the one or more half duplex slots.

In some examples, to support transmitting the one or more uplink messages, the uplink transmission component 845 is capable of, configured to, or operable to support a means for transmitting the one or more uplink messages using the one or more full duplex slots in accordance with the at least one configuration.

In some examples, the uplink transmission component 845 is capable of, configured to, or operable to support a means for refrain from transmitting during the one or more half duplex slots based on the at least one configuration only applying to the one or more full duplex slots.

In some examples, to support receiving the control signaling indicating that the at least one configuration, the configuration indication component 835 is capable of, configured to, or operable to support a means for receiving the control signaling indicating a first configuration that applies to the one or more half duplex slots and a second configuration that applies to the one or more full duplex slots, where transmitting the one or more uplink messages includes. In some examples, to support receiving the control signaling indicating that the at least one configuration, the uplink transmission component 845 is capable of, configured to, or operable to support a means for transmitting a first set of uplink messages using the one or more half duplex slots in accordance with the grant and the first configuration. In some examples, to support receiving the control signaling indicating that the at least one configuration, the uplink transmission component 845 is capable of, configured to, or operable to support a means for transmitting a second set of uplink messages using the one or more full duplex slots in accordance with the grant and the second configuration.

In some examples, the one or more parameters includes a first beam direction and a first beam width associated with the one or more half duplex slots. In some examples, the one or more parameters includes a second beam direction and a second beam width associated with the one or more full duplex slots.

In some examples, to support transmitting the one or more uplink messages, the uplink transmission component 845 is capable of, configured to, or operable to support a means for transmitting a first set of uplink messages using the one or more half duplex slots in accordance with the first beam direction and the first beam width. In some examples, to support transmitting the one or more uplink messages, the uplink transmission component 845 is capable of, configured to, or operable to support a means for transmitting a second set of uplink messages using the one or more full duplex slots in accordance with the second beam direction and the second beam width.

In some examples, the control signaling includes a first bit value that indicates the first beam direction and the first beam width associated with the one or more half duplex slots, and comprises a second bit value that indicates the second beam direction and the second beam width associated with the one or more full duplex slots.

In some examples, the control signaling includes a bit value that indicates the first beam direction and the first beam width associated with the one or more half duplex slots, and the bit value indicates the second beam direction and the second beam width associated with the one or more full duplex slots.

In some examples, the one or more parameters include a first sounding reference signal resource indicator value and a first transmit precoding matrix index value for the one or more half duplex slots. In some examples, the one or more parameters include a second sounding reference signal resource indicator value and a second transmit precoding matrix value for the one or more full duplex slots.

In some examples, to support transmitting one or more uplink messages, the uplink transmission component 845 is capable of, configured to, or operable to support a means for transmitting a first set of uplink messages using the one or more half duplex slots in accordance with the first sounding reference signal resource indicator value and the first transmit precoding matrix index value. In some examples, to support transmitting one or more uplink messages, the uplink transmission component 845 is capable of, configured to, or operable to support a means for transmitting a second set of uplink messages using the one or more full duplex slots in accordance with the second sounding reference signal resource indicator value and the second transmit precoding matrix value.

In some examples, the activation control signal component 855 is capable of, configured to, or operable to support a means for receiving an activation control signaling indicating a beam direction and a beam width, where the at least one configuration indicates that the beam direction and the beam width apply to the one or more full duplex slots, the one or more half duplex slots, or both.

In some examples, the at least one configuration includes a bit value that indicates the one or more parameters, the one or more parameters including a first beam direction and a first beam width for the one or more half duplex slots. In some examples, the bit value maps to a second beam direction and a second beam width for the one or more full duplex slots.

In some examples, the at least one configuration includes a bit value that indicates the one or more parameters, the one or more parameters including a first beam direction and a first beam width for the one or more full duplex slots. In some examples, the bit value maps to a second beam direction and a second beam width associated with the one or more parameters corresponding to the one or more half duplex slots.

Figure 9:
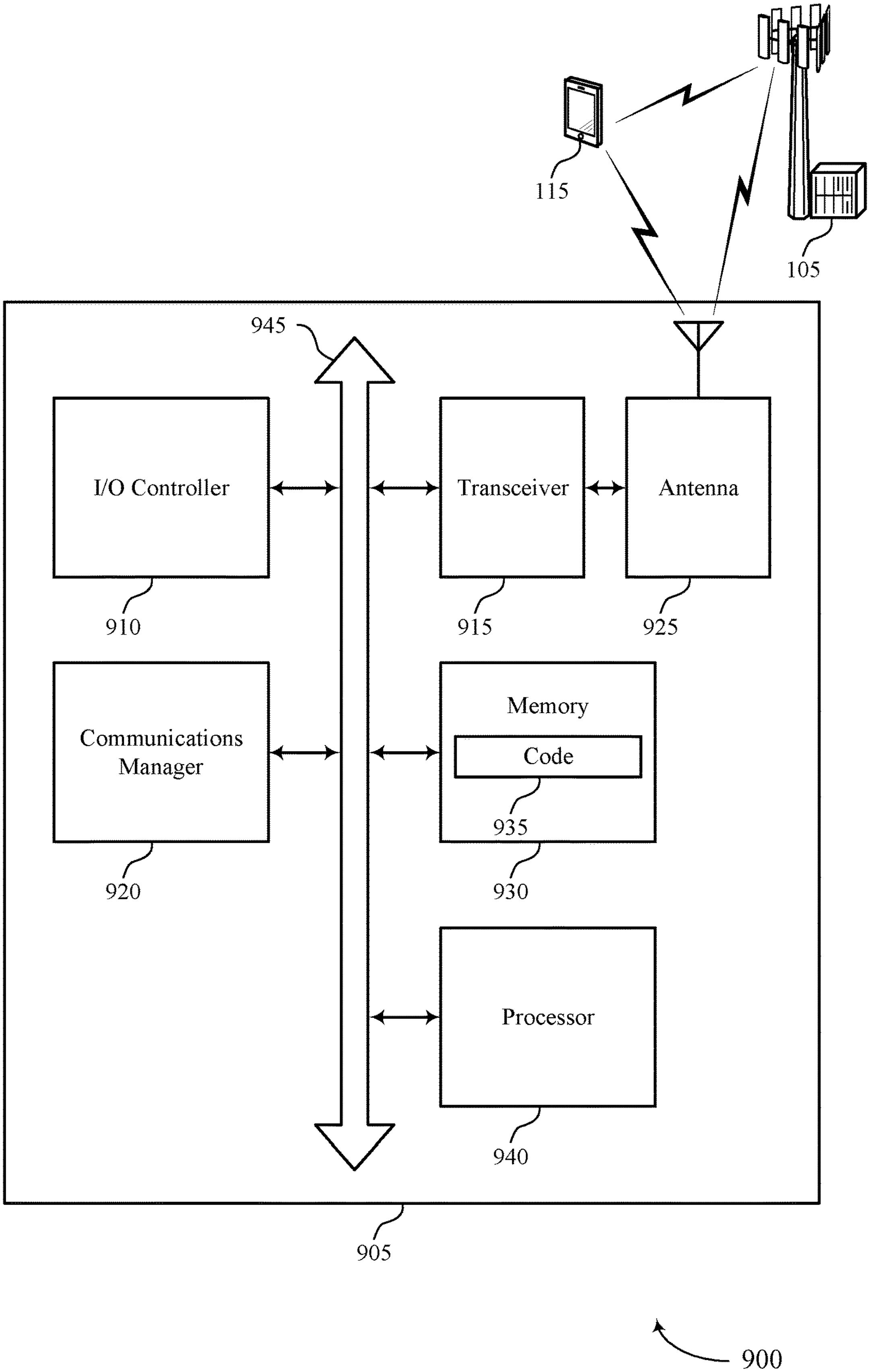
FIG. 9 shows a diagram of a system including a device that supports UL configured grant of full duplex capable UE in accordance with one or more aspects of the present disclosure.

FIG. 9 shows a diagram of a system 900 including a device 905 that supports UL configured grant of full duplex capable UE in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting UL configured grant of full duplex capable UE). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving a grant indicating a set of multiple resources allocated to the UE for uplink transmission. The communications manager 920 is capable of, configured to, or operable to support a means for where the set of multiple resources including one or more half duplex slots and one or more full duplex slots. The communications manager 920 is capable of, configured to, or operable to support a means for receiving control signaling indicating at least one configuration associated with the one or more half duplex slots, the one or more full duplex slots, or both. The communications manager 920 is capable of, configured to, or operable to support a means for where the at least one configuration indicating one or more parameters corresponding to the one or more half duplex slots, the one or more full duplex slots, or both. The communications manager 920 is capable of, configured to, or operable to support a means for transmitting one or more uplink messages in accordance with the grant and the control signaling.

By including or configuring the communications manager 920 in accordance with examples as described herein, the device 905 may support techniques for improved communication reliability, reduced latency, more efficient utilization of communication resources, improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of UL configured grant of full duplex capable UE as described herein, or the at least one processor 940 and the at least one memory 930 may be otherwise configured to, individually or collectively, perform or support such operations.

Figure 10:
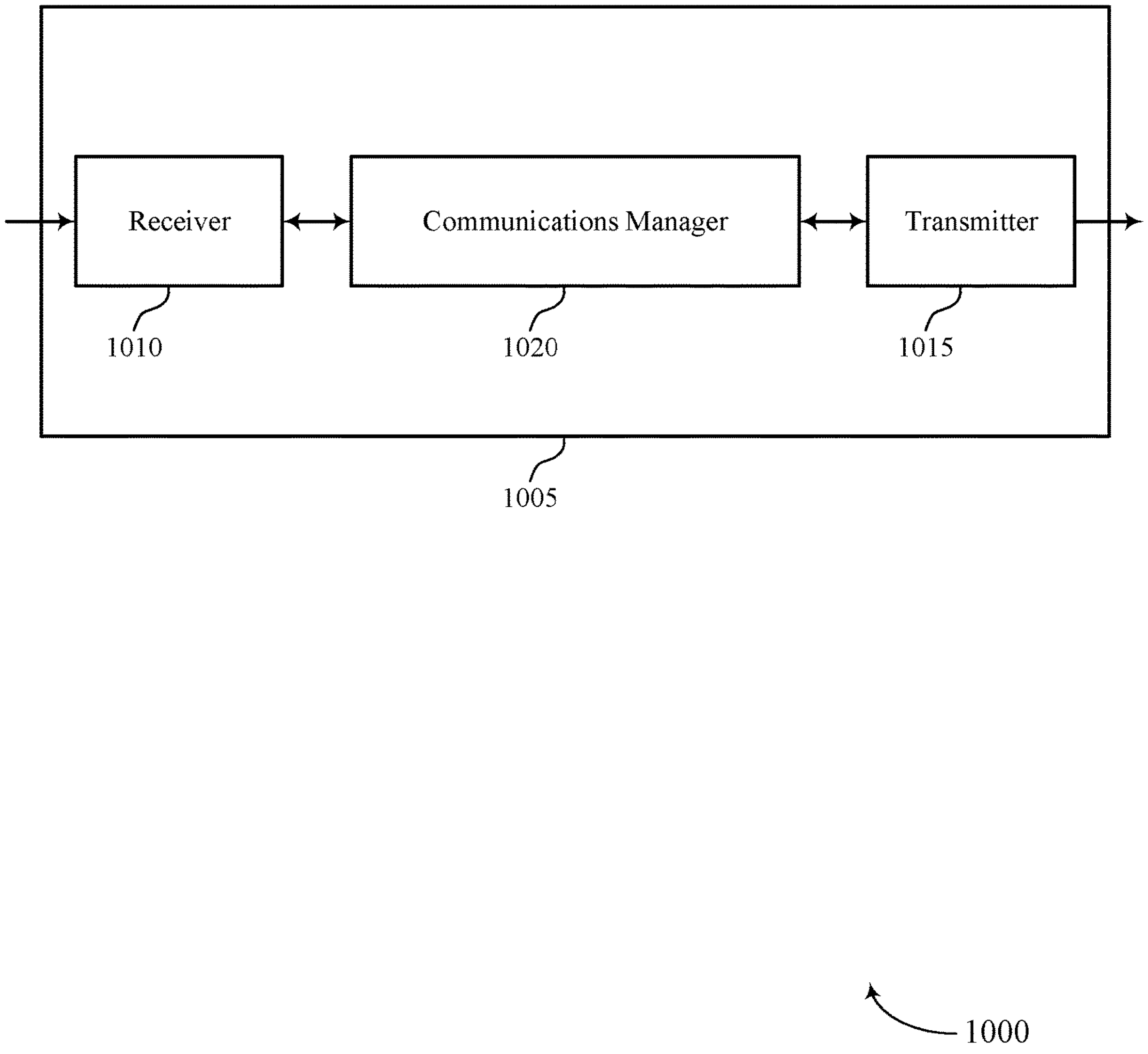
FIGS. 10 and 11 show block diagrams of devices that support UL configured grant of full duplex capable UE in accordance with one or more aspects of the present disclosure.

FIG. 10 shows a block diagram 1000 of a device 1005 that supports UL configured grant of full duplex capable UE in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of UL configured grant of full duplex capable UE as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, a grant indicating a set of multiple resources allocated to the UE for uplink transmission. The communications manager 1020 is capable of, configured to, or operable to support a means for where the set of multiple resources including one or more half duplex slots and one or more full duplex slots. The communications manager 1020 is capable of, configured to, or operable to support a means for transmitting, to the UE, control signaling indicating at least one configuration associated with the one or more half duplex slots, the one or more full duplex slots, or both. The communications manager 1020 is capable of, configured to, or operable to support a means for where the at least one configuration including one or more parameters corresponding to the one or more half duplex slots, the one or more full duplex slots, or both. The communications manager 1020 is capable of, configured to, or operable to support a means for monitoring for one or more uplink messages according to the grant and the control signaling.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for more efficient utilization of communication resources.

Figure 11:
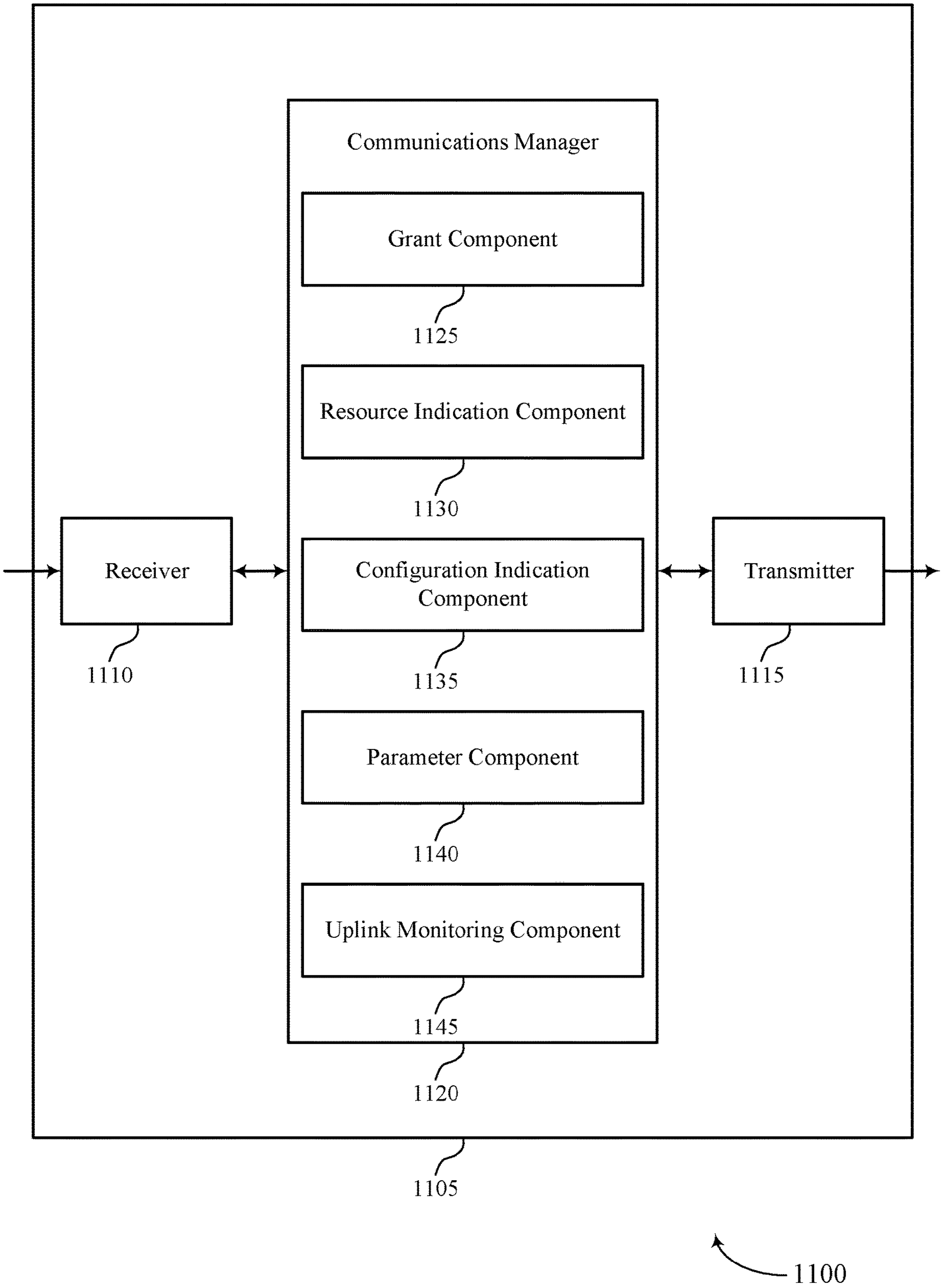

FIG. 11 shows a block diagram 1100 of a device 1105 that supports UL configured grant of full duplex capable UE in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of UL configured grant of full duplex capable UE as described herein. For example, the communications manager 1120 may include a grant component 1125, a resource indication component 1130, a configuration indication component 1135, a parameter component 1140, an uplink monitoring component 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The grant component 1125 is capable of, configured to, or operable to support a means for transmitting, to a UE, a grant indicating a set of multiple resources allocated to the UE for uplink transmission. The resource indication component 1130 is capable of, configured to, or operable to support a means for where the set of multiple resources includes one or more half duplex slots and one or more full duplex slots. The configuration indication component 1135 is capable of, configured to, or operable to support a means for transmitting, to the UE, control signaling indicating at least one configuration associated with the one or more half duplex slots, the one or more full duplex slots, or both. The parameter component 1140 is capable of, configured to, or operable to support a means for where the at least one configuration indicates one or more parameters corresponding to the one or more half duplex slots, the one or more full duplex slots, or both. The uplink monitoring component 1145 is capable of, configured to, or operable to support a means for monitoring for one or more uplink messages according to the grant and the control signaling.

Figure 12:
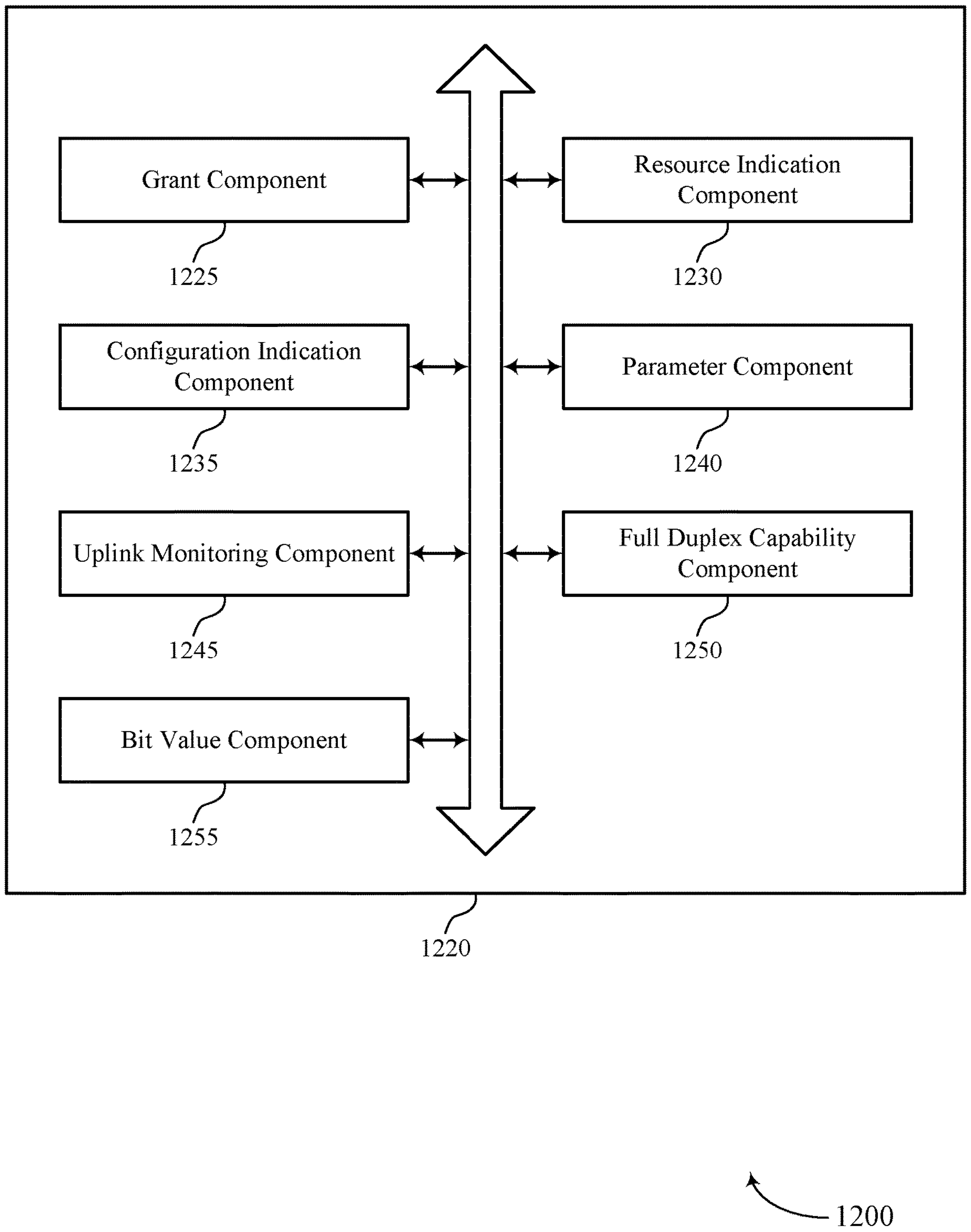
FIG. 12 shows a block diagram of a communications manager that supports UL configured grant of full duplex capable UE in accordance with one or more aspects of the present disclosure.

FIG. 12 shows a block diagram 1200 of a communications manager 1220 that supports UL configured grant of full duplex capable UE in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of UL configured grant of full duplex capable UE as described herein. For example, the communications manager 1220 may include a grant component 1225, a resource indication component 1230, a configuration indication component 1235, a parameter component 1240, an uplink monitoring component 1245, a full duplex capability component 1250, a bit value component 1255, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The grant component 1225 is capable of, configured to, or operable to support a means for transmitting, to a UE, a grant indicating a set of multiple resources allocated to the UE for uplink transmission. The resource indication component 1230 is capable of, configured to, or operable to support a means for where the set of multiple resources includes one or more half duplex slots and one or more full duplex slots. The configuration indication component 1235 is capable of, configured to, or operable to support a means for transmitting, to the UE, control signaling indicating at least one configuration associated with the one or more half duplex slots, the one or more full duplex slots, or both. The parameter component 1240 is capable of, configured to, or operable to support a means for where the at least one configuration indicates one or more parameters corresponding to the one or more half duplex slots, the one or more full duplex slots, or both. The uplink monitoring component 1245 is capable of, configured to, or operable to support a means for monitoring for one or more uplink messages according to the grant and the control signaling.

In some examples, the full duplex capability component 1250 is capable of, configured to, or operable to support a means for receiving an indication of a full duplexing capability associated with the UE, where the control signaling is based on the indication.

In some examples, to support monitoring for the one or more uplink messages, the uplink monitoring component 1245 is capable of, configured to, or operable to support a means for monitoring for the one or more uplink messages over the one or more half duplex slots in accordance with the at least one configuration.

In some examples, to support monitoring for one or more uplink messages, the uplink monitoring component 1245 is capable of, configured to, or operable to support a means for monitoring for the one or more uplink messages over the one or more full duplex slots in accordance with the at least one configuration.

In some examples, to support transmitting the control signaling indicating the at least one configuration, the configuration indication component 1235 is capable of, configured to, or operable to support a means for transmitting the control signaling indicating a first configuration that applies to the one or more half duplex slots and a second configuration that applies to the one or more full duplex slots. In some examples, to support transmitting the control signaling indicating the at least one configuration, the uplink monitoring component 1245 is capable of, configured to, or operable to support a means for monitoring for a first set of uplink messages over the one or more half duplex slots in accordance with the grant and the first configuration. In some examples, to support transmitting the control signaling indicating the at least one configuration, the uplink monitoring component 1245 is capable of, configured to, or operable to support a means for monitoring for a second set of uplink messages over the one or more full duplex slots in accordance with the grant and the second configuration.

In some examples, the one or more parameters includes a first beam direction and a first beam width associated with the one or more half duplex slots, and the one or more parameters includes a second beam direction and a second beam width associated with the one or more full duplex slots.

In some examples, to support monitoring for the one or more uplink messages, the uplink monitoring component 1245 is capable of, configured to, or operable to support a means for monitoring for a first set of uplink messages over the one or more half duplex slots in accordance with the first beam direction and the first beam width. In some examples, to support monitoring for the one or more uplink messages, the uplink monitoring component 1245 is capable of, configured to, or operable to support a means for monitoring for a second set of uplink messages using the one or more full duplex slots in accordance with the second beam direction and the second beam width.

In some examples, the control signaling includes a first bit value that indicates the first beam direction and the first beam width associated with the one or more half duplex slots, and comprises a second bit value that indicates the second beam direction and the second beam width associated with the one or more full duplex slots.

In some examples, the one or more parameters include a first sounding reference signal resource indicator value and a first transmit precoding matrix index value for the one or more half duplex slots. In some examples, the one or more parameters include a second sounding reference signal resource indicator value and a second transmit precoding matrix value for the one or more full duplex slots.

In some examples, to support monitoring for the one or more uplink messages, the uplink monitoring component 1245 is capable of, configured to, or operable to support a means for monitoring for a first set of uplink messages using the one or more half duplex slots in accordance with the first sounding reference signal resource indicator value and the first transmit precoding matrix index value. In some examples, to support monitoring for the one or more uplink messages, the uplink monitoring component 1245 is capable of, configured to, or operable to support a means for monitoring for a second set of uplink messages using the one or more full duplex slots in accordance with the second sounding reference signal resource indicator value and the second transmit precoding matrix value.

Figure 13:
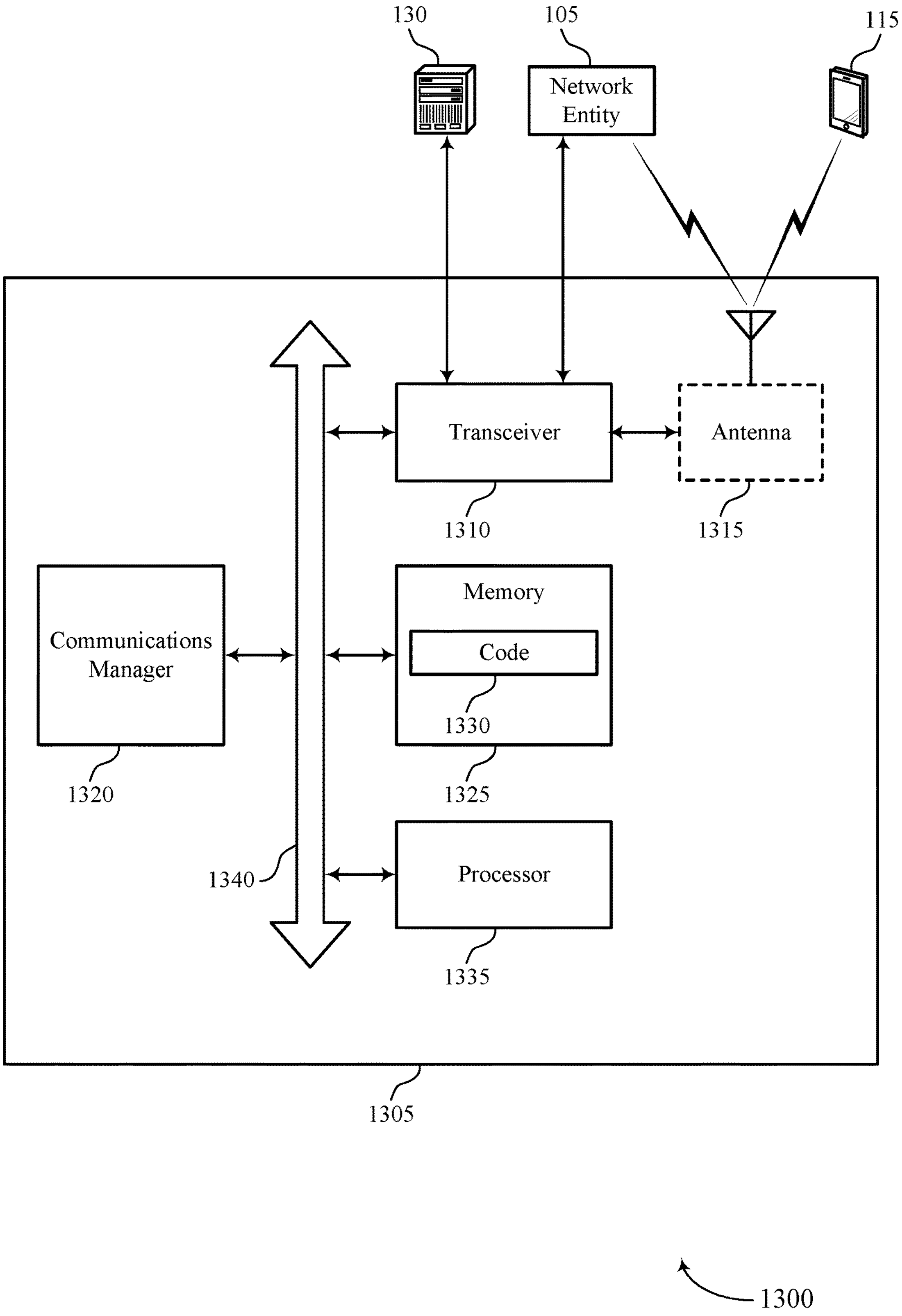
FIG. 13 shows a diagram of a system including a device that supports UL configured grant of full duplex capable UE in accordance with one or more aspects of the present disclosure.

FIG. 13 shows a diagram of a system 1300 including a device 1305 that supports UL configured grant of full duplex capable UE in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting UL configured grant of full duplex capable UE). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, a grant indicating a set of multiple resources allocated to the UE for uplink transmission. The communications manager 1320 is capable of, configured to, or operable to support a means for where the set of multiple resources including one or more half duplex slots and one or more full duplex slots. The communications manager 1320 is capable of, configured to, or operable to support a means for transmitting, to the UE, control signaling indicating at least one configuration associated with the one or more half duplex slots, the one or more full duplex slots, or both. The communications manager 1320 is capable of, configured to, or operable to support a means for where the at least one configuration including one or more parameters corresponding to the one or more half duplex slots, the one or more full duplex slots, or both. The communications manager 1320 is capable of, configured to, or operable to support a means for monitoring for one or more uplink messages according to the grant and the control signaling.

By including or configuring the communications manager 1320 in accordance with examples as described herein, the device 1305 may support techniques for improved communication reliability, reduced latency, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of UL configured grant of full duplex capable UE as described herein, or the at least one processor 1335 and the at least one memory 1325 may be otherwise configured to, individually or collectively, perform or support such operations.

Figure 14:
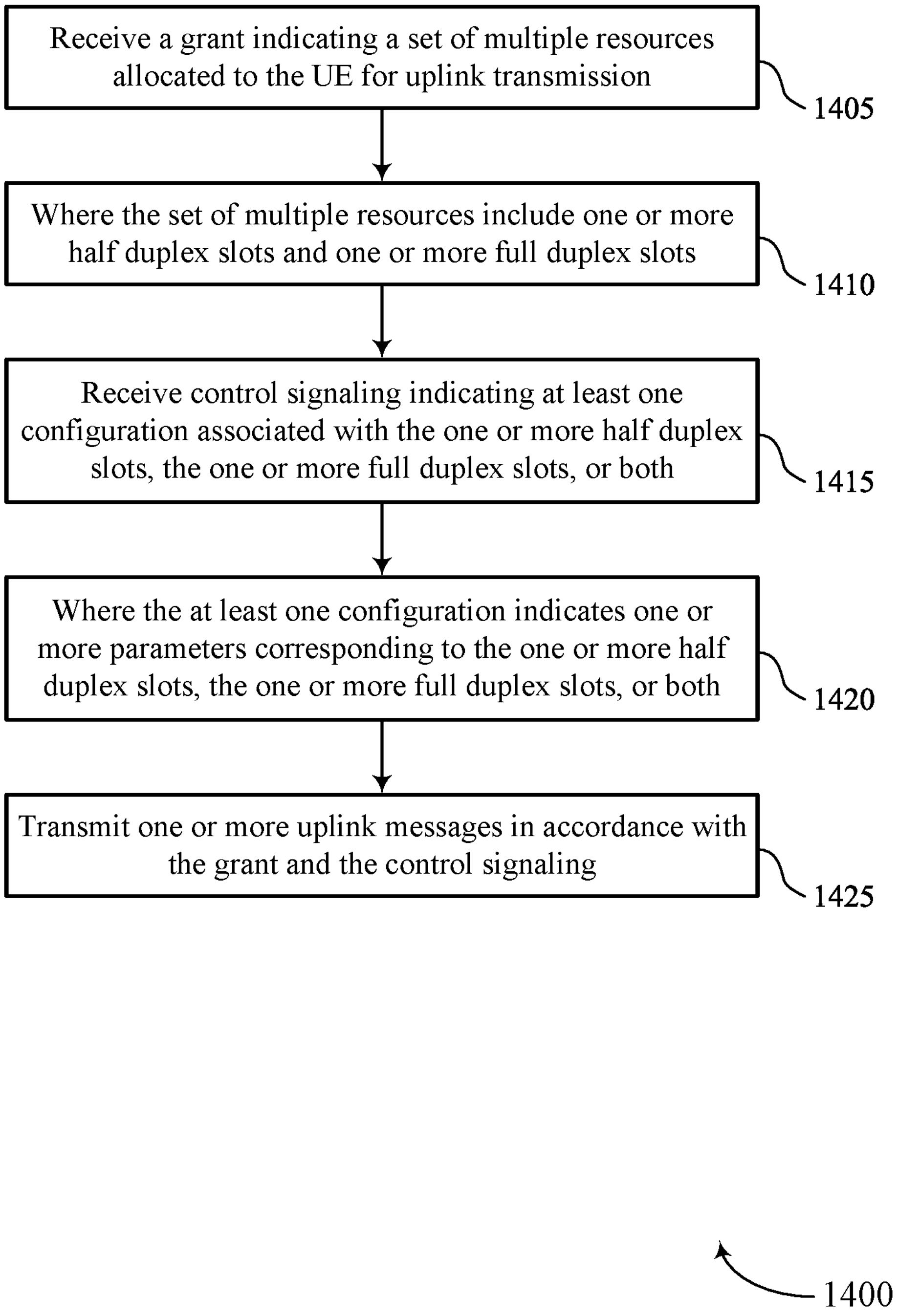
FIGS. 14 and 15 show flowcharts illustrating methods that support UL configured grant of full duplex capable UE in accordance with one or more aspects of the present disclosure.

FIG. 14 shows a flowchart illustrating a method 1400 that supports UL configured grant of full duplex capable UE in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a grant indicating a set of multiple resources allocated to the UE for uplink transmission. The operations of block 1405 may be performed in accordance with examples as disclosed herein. In some examples, aspects of the operations of 1405 may be performed by a grand component 825 as described with reference to FIG. 8.

At 1410, the method may include where the set of multiple resources includes one or more half duplex slots and one or more full duplex slots. The operations of block 1410 may be performed in accordance with examples as disclosed herein. In some examples, aspects of the operations of 1410 may be performed by a resource indication component 830 as described with reference to FIG. 8.

At 1415, the method may include receiving control signaling indicating at least one configuration associated with the one or more half duplex slots, the one or more full duplex slots, or both. The operations of block 1415 may be performed in accordance with examples as disclosed herein. In some examples, aspects of the operations of 1415 may be performed by a configuration indication component 835 as described with reference to FIG. 8.

At 1420, the method may include where the at least one configuration indicates one or more parameters corresponding to the one or more half duplex slots, the one or more full duplex slots, or both. The operations of block 1420 may be performed in accordance with examples as disclosed herein. In some examples, aspects of the operations of 1420 may be performed by a parameter component 840 as described with reference to FIG. 8.

At 1425, the method may include transmitting one or more uplink messages in accordance with the grant and the control signaling. The operations of block 1425 may be performed in accordance with examples as disclosed herein. In some examples, aspects of the operations of 1425 may be performed by an uplink transmission component 845 as described with reference to FIG. 8.

Figure 15:
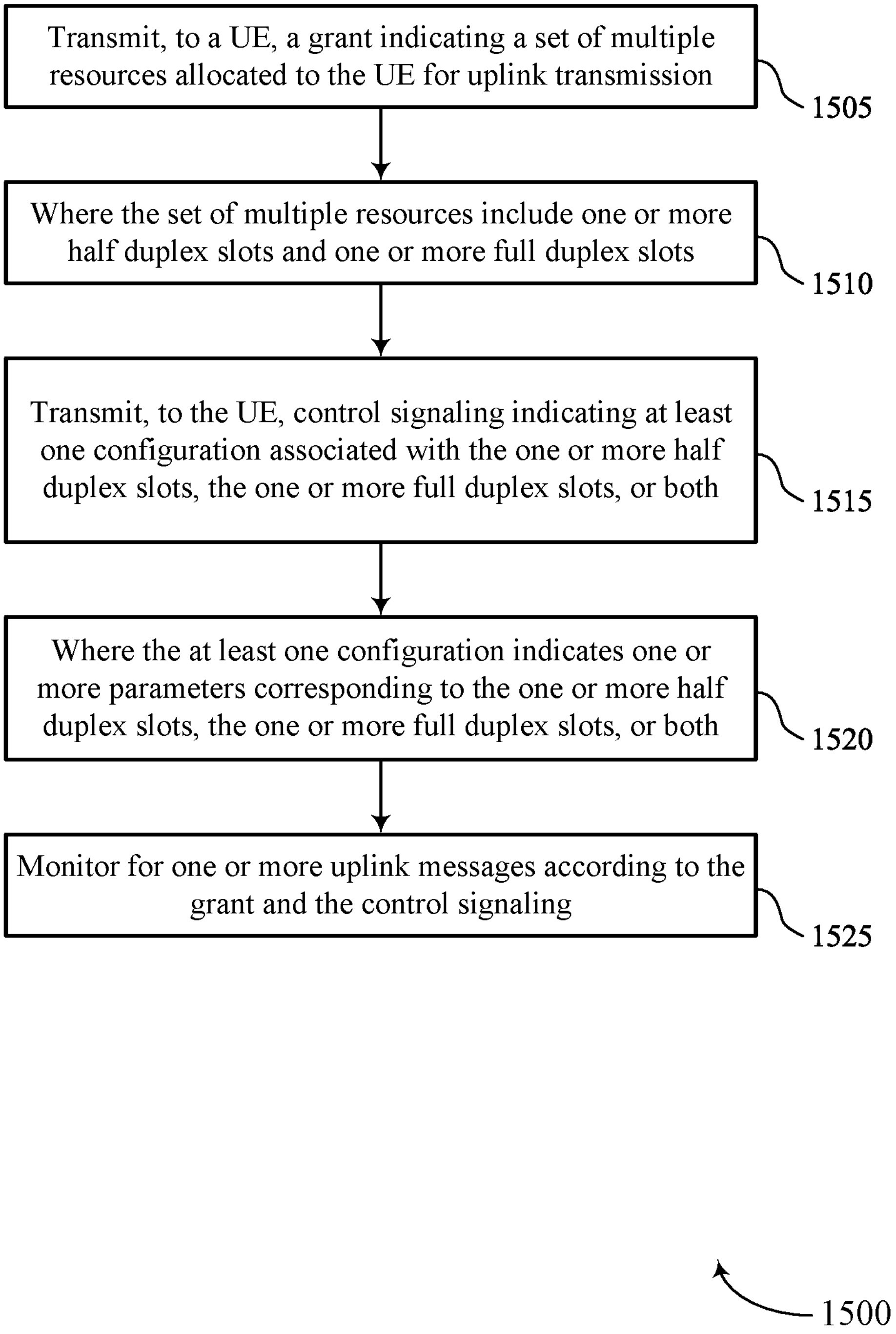

FIG. 15 shows a flowchart illustrating a method 1500 that supports UL configured grant of full duplex capable UE in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, a grant indicating a set of multiple resources allocated to the UE for uplink transmission. The operations of block 1505 may be performed in accordance with examples as disclosed herein. In some examples, aspects of the operations of 1505 may be performed by a grant component 1225 as described with reference to FIG. 12.

At 1510, the method may include where the set of multiple resources includes one or more half duplex slots and one or more full duplex slots. The operations of block 1510 may be performed in accordance with examples as disclosed herein. In some examples, aspects of the operations of 1510 may be performed by a resource indication component 1230 as described with reference to FIG. 12.

At 1515, the method may include transmitting, to the UE, control signaling indicating at least one configuration associated with the one or more half duplex slots, the one or more full duplex slots, or both. The operations of block 1515 may be performed in accordance with examples as disclosed herein. In some examples, aspects of the operations of 1515 may be performed by a configuration indication component 1235 as described with reference to FIG. 12.

At 1520, the method may include where the at least one configuration indicates one or more parameters corresponding to the one or more half duplex slots, the one or more full duplex slots, or both. The operations of block 1520 may be performed in accordance with examples as disclosed herein. In some examples, aspects of the operations of 1520 may be performed by a parameter component 1240 as described with reference to FIG. 12.

At 1525, the method may include monitoring for one or more uplink messages according to the grant and the control signaling. The operations of block 1525 may be performed in accordance with examples as disclosed herein. In some examples, aspects of the operations of 1525 may be performed by an uplink monitoring component 1245 as described with reference to FIG. 12.

The following provides an overview of aspects of the present disclosure:

Aspect 1: A method for wireless communications at a UE, comprising: receiving a grant indicating a plurality of resources allocated to the UE for uplink transmission, wherein the plurality of resources comprises one or more half duplex slots and one or more full duplex slots; receiving control signaling indicating at least one configuration associated with the one or more half duplex slots, the one or more full duplex slots, or both, wherein the at least one configuration indicates one or more parameters corresponding to the one or more half duplex slots, the one or more full duplex slots, or both; and transmitting one or more uplink messages in accordance with the grant and the control signaling.

Aspect 2: The method of aspect 1, further comprising: transmitting an indication of a full duplexing capability associated with the UE, wherein the control signaling is based at least in part on the indication.

Aspect 3: The method of any of aspects 1 through 2, wherein the at least one configuration only applies to the one or more half duplex slots, and wherein transmitting the one or more uplink messages comprises: transmitting the one or more uplink messages using the one or more half duplex slots in accordance with the at least one configuration.

Aspect 4: The method of aspect 3, further comprising: refraining from transmitting during the one or more full duplex slots based at least in part on the at least one configuration only applying to the one or more half duplex slots.

Aspect 5: The method of any of aspects 1 through 2, wherein the at least one configuration only applies to the one or more full duplex slots, and wherein transmitting the one or more uplink messages comprises: transmitting the one or more uplink messages using the one or more full duplex slots in accordance with the at least one configuration.

Aspect 6: The method of aspect 5, further comprising: refrain from transmitting during the one or more half duplex slots based at least in part on the at least one configuration only applying to the one or more full duplex slots.

Aspect 7: The method of any of aspects 1 through 2, wherein receiving the control signaling indicating that the at least one configuration comprises: receiving the control signaling indicating a first configuration that applies to the one or more half duplex slots and a second configuration that applies to the one or more full duplex slots, wherein transmitting the one or more uplink messages comprises: transmitting a first set of uplink messages using the one or more half duplex slots in accordance with the grant and the first configuration; and transmitting a second set of uplink messages using the one or more full duplex slots in accordance with the grant and the second configuration.

Aspect 8: The method of any of aspects 1 through 2 and 7, wherein the one or more parameters comprises a first beam direction and a first beam width associated with the one or more half duplex slots, and the one or more parameters comprises a second beam direction and a second beam width associated with the one or more full duplex slots.

Aspect 9: The method of aspect 8, wherein transmitting the one or more uplink messages comprises: transmitting a first set of uplink messages using the one or more half duplex slots in accordance with the first beam direction and the first beam width; and transmitting a second set of uplink messages using the one or more full duplex slots in accordance with the second beam direction and the second beam width.

Aspect 10: The method of any of aspects 8 through 9, wherein the control signaling comprises a first bit value that indicates the first beam direction and the first beam width associated with the one or more half duplex slots, and comprises a second bit value that indicates the second beam direction and the second beam width associated with the one or more full duplex slots.

Aspect 11: The method of aspect 10, wherein the control signaling comprises a bit value that indicates the first beam direction and the first beam width associated with the one or more half duplex slots, and the bit value indicates the second beam direction and the second beam width associated with the one or more full duplex slots.

Aspect 12: The method of any of aspects 8 through 11, wherein the one or more parameters comprise a first sounding reference signal resource indicator value and a first transmit precoding matrix index value for the one or more half duplex slots, and the one or more parameters comprise a second sounding reference signal resource indicator value and a second transmit precoding matrix value for the one or more full duplex slots.

Aspect 13: The method of aspect 12, wherein transmitting one or more uplink messages comprises: transmitting a first set of uplink messages using the one or more half duplex slots in accordance with the first sounding reference signal resource indicator value and the first transmit precoding matrix index value; and transmitting a second set of uplink messages using the one or more full duplex slots in accordance with the second sounding reference signal resource indicator value and the second transmit precoding matrix value.

Aspect 14: The method of any of aspects 1 through 13, further comprising: receiving an activation control signaling indicating a beam direction and a beam width, wherein the at least one configuration indicates that the beam direction and the beam width apply to the one or more full duplex slots, the one or more half duplex slots, or both.

Aspect 15: The method of any of aspects 1 through 14, wherein the at least one configuration comprises a bit value that indicates the one or more parameters, the one or more parameters comprising a first beam direction and a first beam width for the one or more half duplex slots; and the bit value maps to a second beam direction and a second beam width for the one or more full duplex slots.

Aspect 16: The method of any of aspects 1 through 15, wherein the at least one configuration comprises a bit value that indicates the one or more parameters, the one or more parameters comprising a first beam direction and a first beam width for the one or more full duplex slots; and the bit value maps to a second beam direction and a second beam width associated with the one or more parameters corresponding to the one or more half duplex slots.

Aspect 17: A method for wireless communications at a network entity, comprising: transmitting, to a UE, a grant indicating a plurality of resources allocated to the UE for uplink transmission, wherein the plurality of resources comprises one or more half duplex slots and one or more full duplex slots; transmitting, to the UE, control signaling indicating at least one configuration associated with the one or more half duplex slots, the one or more full duplex slots, or both, wherein the at least one configuration comprises one or more parameters corresponding to the one or more half duplex slots, the one or more full duplex slots, or both; and monitoring for one or more uplink messages according to the grant and the control signaling.

Aspect 18: The method of aspect 17, further comprising: receiving an indication of a full duplexing capability associated with the UE, wherein the control signaling is based at least in part on the indication.

Aspect 19: The method of any of aspects 17 through 18, wherein the at least one configuration only applies to the one or more half duplex slots, and wherein monitoring for the one or more uplink messages comprises: monitoring for the one or more uplink messages over the one or more half duplex slots in accordance with the at least one configuration.

Aspect 20: The method of any of aspects 17 through 18, wherein the at least one configuration only apples to the one or more full duplex slots, and wherein monitoring for one or more uplink messages comprises: monitoring for the one or more uplink messages over the one or more full duplex slots in accordance with the at least one configuration.

Aspect 21: The method of any of aspects 17 through 18, wherein transmitting the control signaling indicating the at least one configuration further comprises: transmitting the control signaling indicating a first configuration that applies to the one or more half duplex slots and a second configuration that applies to the one or more full duplex slots, wherein monitoring for the one or more uplink messages comprises: monitoring for a first set of uplink messages over the one or more half duplex slots in accordance with the grant and the first configuration; and monitoring for a second set of uplink messages over the one or more full duplex slots in accordance with the grant and the second configuration.

Aspect 22: The method of any of aspects 17 through 21, wherein the one or more parameters comprises a first beam direction and a first beam width associated with the one or more half duplex slots, and the one or more parameters comprises a second beam direction and a second beam width associated with the one or more full duplex slots.

Aspect 23: The method of aspect 22, wherein monitoring for the one or more uplink messages further comprises: monitoring for a first set of uplink messages over the one or more half duplex slots in accordance with the first beam direction and the first beam width; and monitoring for a second set of uplink messages using the one or more full duplex slots in accordance with the second beam direction and the second beam width.

Aspect 24: The method of any of aspects 22 through 23, wherein the control signaling comprises a first bit value that indicates the first beam direction and the first beam width associated with the one or more half duplex slots, and comprises a second bit value that indicates the second beam direction and the second beam width associated with the one or more full duplex slots.

Aspect 25: The method of any of aspects 22 through 24, wherein the one or more parameters comprise a first sounding reference signal resource indicator value and a first transmit precoding matrix index value for the one or more half duplex slots; and the one or more parameters comprise a second sounding reference signal resource indicator value and a second transmit precoding matrix value for the one or more full duplex slots.

Aspect 26: The method of aspect 25, wherein monitoring for the one or more uplink messages comprises: monitoring for a first set of uplink messages using the one or more half duplex slots in accordance with the first sounding reference signal resource indicator value and the first transmit precoding matrix index value; and monitoring for a second set of uplink messages using the one or more full duplex slots in accordance with the second sounding reference signal resource indicator value and the second transmit precoding matrix value.

Aspect 27: A UE for wireless communications, comprising one or more memories storing processor-executable code, and one or more processors coupled with the one or more memories and individually or collectively operable to execute the code to cause the UE to perform a method of any of aspects 1 through 16.

Aspect 28: A UE for wireless communications, comprising at least one means for performing a method of any of aspects 1 through 16.

Aspect 29: A non-transitory computer-readable medium storing code for wireless communications, the code comprising instructions executable by a processor to perform a method of any of aspects 1 through 16.

Aspect 30: A network entity for wireless communications, comprising one or more memories storing processor-executable code, and one or more processors coupled with the one or more memories and individually or collectively operable to execute the code to cause the network entity to perform a method of any of aspects 17 through 26.

Aspect 31: A network entity for wireless communications, comprising at least one means for performing a method of any of aspects 17 through 26.

Aspect 32: A non-transitory computer-readable medium storing code for wireless communications, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a grant indicating a plurality of resources allocated to the UE for uplink transmission, wherein the plurality of resources comprise one or more half duplex slots and one or more full duplex slots;

receive control signaling indicating at least one configuration associated with the one or more half duplex slots, the one or more full duplex slots, or both, wherein the at least one configuration indicates one or more parameters corresponding to the one or more half duplex slots, the one or more full duplex slots, or both, wherein the one or more parameters comprises a first beam direction and a first beam width associated with the one or more half duplex slots, and wherein the one or more parameters comprises a second beam direction and a second beam width associated with the one or more full duplex slots; and transmit one or more uplink messages in accordance with the grant and the control signaling.

2. The UE of claim 1, wherein the one or more processors are individually or collectively further operable to execute the code to cause the UE to:

transmit an indication of a full duplexing capability associated with the UE, wherein the control signaling is based at least in part on the indication.

3. The UE of claim 1, wherein, to transmit the one or more uplink messages, the one or more processors are individually or collectively operable to execute the code to cause the UE to:

transmit the one or more uplink messages using the one or more half duplex slots in accordance with the at least one configuration.

4. The UE of claim 3, wherein the one or more processors are individually or collectively further operable to execute the code to cause the UE to:

refrain from transmission during the one or more full duplex slots based at least in part on the at least one configuration only applying to the one or more half duplex slots.

5. The UE of claim 1, wherein, to transmit the one or more uplink messages, the one or more processors are individually or collectively operable to execute the code to cause the UE to:

transmit the one or more uplink messages using the one or more full duplex slots in accordance with the at least one configuration.

6. The UE of claim 5, wherein the one or more processors are individually or collectively further operable to execute the code to cause the UE to:

refrain from transmission during the one or more half duplex slots based at least in part on the at least one configuration only applying to the one or more full duplex slots.

7. The UE of claim 1, wherein, to receive the control signaling indicating that the at least one configuration, the one or more processors are individually or collectively operable to execute the code to cause the UE to:

receive the control signaling indicating a first configuration that applies to the one or more half duplex slots and a second configuration that applies to the one or more full duplex slots, wherein, to transmit the one or more uplink messages, the one or more processors are individually or collectively operable to execute the code to cause the UE to:

transmit a first set of uplink messages using the one or more half duplex slots in accordance with the grant and the first configuration; and transmit a second set of uplink messages using the one or more full duplex slots in accordance with the grant and the second configuration.

8. The UE of claim 1, wherein, to transmit the one or more uplink messages, the one or more processors are individually or collectively operable to execute the code to cause the UE to:

transmit a first set of uplink messages using the one or more half duplex slots in accordance with the first beam direction and the first beam width; and transmit a second set of uplink messages using the one or more full duplex slots in accordance with the second beam direction and the second beam width.

9. The UE of claim 1, wherein the control signaling comprises a first bit value that indicates the first beam direction and the first beam width associated with the one or more half duplex slots, and comprises a second bit value that indicates the second beam direction and the second beam width associated with the one or more full duplex slots.

10. The UE of claim 1, wherein the control signaling comprises a bit value that indicates the first beam direction and the first beam width associated with the one or more half duplex slots, and the bit value indicates the second beam direction and the second beam width associated with the one or more full duplex slots.

11. The UE of claim 1, wherein:

the one or more parameters comprise a first sounding reference signal resource indicator value and a first transmit precoding matrix index value for the one or more half duplex slots, and the one or more parameters comprise a second sounding reference signal resource indicator value and a second transmit precoding matrix value for the one or more full duplex slots.

12. The UE of claim 11, wherein, to transmit the one or more uplink messages, the one or more processors are individually or collectively operable to execute the code to cause the UE to:

transmit a first set of uplink messages using the one or more half duplex slots in accordance with the first sounding reference signal resource indicator value and the first transmit precoding matrix index value; and transmit a second set of uplink messages using the one or more full duplex slots in accordance with the second sounding reference signal resource indicator value and the second transmit precoding matrix value.

13. The UE of claim 1, wherein the one or more processors are individually or collectively further operable to execute the code to cause the UE to:

receive an activation control signaling indicating a beam direction and a beam width, wherein the at least one configuration indicates that the beam direction and the beam width apply to the one or more full duplex slots, the one or more half duplex slots, or both.

14. The UE of claim 1, wherein:

the at least one configuration comprises a bit value that indicates the one or more parameters, the one or more parameters comprising a first beam direction and a first beam width for the one or more half duplex slots; and the bit value maps to a second beam direction and a second beam width for the one or more full duplex slots.

15. The UE of claim 1, wherein:

the at least one configuration comprises a bit value that indicates the one or more parameters, the one or more parameters comprising a first beam direction and a first beam width for the one or more full duplex slots; and the bit value maps to a second beam direction and a second beam width associated with the one or more parameters corresponding to the one or more half duplex slots.

16. A network entity, comprising:

one or more memories storing processor-executable code; and one or more processors coupled with the one or more memories and individually or collectively operable to execute the code to cause the network entity to:

transmit, to a user equipment (UE), a grant indicating a plurality of resources allocated to the UE for uplink transmission, wherein the plurality of resources comprise one or more half duplex slots and one or more full duplex slots;

transmit, to the UE, control signaling indicating at least one configuration associated with the one or more half duplex slots, the one or more full duplex slots, or both, wherein the at least one configuration comprise one or more parameters corresponding to the one or more half duplex slots, the one or more full duplex slots, or both, wherein the one or more parameters comprises a first beam direction and a first beam width associated with the one or more half duplex slots, and wherein the one or more parameters comprises a second beam direction and a second beam width associated with the one or more full duplex slots; and monitor for one or more uplink messages according to the grant and the control signaling.

17. The network entity of claim 16, wherein the one or more processors are individually or collectively further operable to execute the code to cause the network entity to:

receive an indication of a full duplexing capability associated with the UE, wherein the control signaling is based at least in part on the indication.

18. The network entity of claim 16, wherein, to monitor for the one or more uplink messages, the one or more processors are individually or collectively operable to execute the code to cause the network entity to:

monitor for the one or more uplink messages over the one or more half duplex slots in accordance with the at least one configuration.

19. The network entity of claim 16, wherein, to monitor for the one or more uplink messages, the one or more processors are individually or collectively operable to execute the code to cause the network entity to:

monitor for the one or more uplink messages over the one or more full duplex slots in accordance with the at least one configuration.

20. The network entity of claim 16, wherein, to transmit the control signaling indicating the at least one configuration, the one or more processors are individually or collectively further operable to execute the code to cause the network entity to:

transmit the control signaling indicating a first configuration that applies to the one or more half duplex slots and a second configuration that applies to the one or more full duplex slots, wherein, to monitor for the one or more uplink messages, the one or more processors are individually or collectively operable to execute the code to cause the network entity to:

monitor for a first set of uplink messages over the one or more half duplex slots in accordance with the grant and the first configuration; and monitor for a second set of uplink messages over the one or more full duplex slots in accordance with the grant and the second configuration.

21. The network entity of claim 16, wherein, to monitor for the one or more uplink messages, the one or more processors are individually or collectively further operable to execute the code to cause the network entity to:

monitor for a first set of uplink messages over the one or more half duplex slots in accordance with the first beam direction and the first beam width; and monitor for a second set of uplink messages using the one or more full duplex slots in accordance with the second beam direction and the second beam width.

22. The network entity of claim 16, wherein the control signaling comprises a first bit value that indicates the first beam direction and the first beam width associated with the one or more half duplex slots, and comprises a second bit value that indicates the second beam direction and the second beam width associated with the one or more full duplex slots.

23. The network entity of claim 16, wherein:

the one or more parameters comprise a first sounding reference signal resource indicator value and a first transmit precoding matrix index value for the one or more half duplex slots; and the one or more parameters comprise a second sounding reference signal resource indicator value and a second transmit precoding matrix value for the one or more full duplex slots.

24. The network entity of claim 23, wherein, to monitor for the one or more uplink messages, the one or more processors are individually or collectively operable to execute the code to cause the network entity to:

monitor for a first set of uplink messages using the one or more half duplex slots in accordance with the first sounding reference signal resource indicator value and the first transmit precoding matrix index value; and monitor for a second set of uplink messages using the one or more full duplex slots in accordance with the second sounding reference signal resource indicator value and the second transmit precoding matrix value.

25. A method for wireless communications at a user equipment (UE), comprising:

receiving a grant indicating a plurality of resources allocated to the UE for uplink transmission, wherein the plurality of resources comprises one or more half duplex slots and one or more full duplex slots;

receiving control signaling indicating at least one configuration associated with the one or more half duplex slots, the one or more full duplex slots, or both, wherein the at least one configuration indicates one or more parameters corresponding to the one or more half duplex slots, the one or more full duplex slots, or both;

receiving an activation control signaling indicating a beam direction and a beam width, wherein the at least one configuration indicates that the beam direction and the beam width apply to the one or more full duplex slots, the one or more half duplex slots, or both; and transmitting one or more uplink messages in accordance with the grant and the control signaling.

26. The method of claim 25, further comprising:

transmitting an indication of a full duplexing capability associated with the UE, wherein the control signaling is based at least in part on the indication.

27. A user equipment (UE), comprising:

one or more memories storing processor-executable code; and one or more processors coupled with the one or more memories and individually or collectively operable to execute the code to cause the UE to:

receive a grant indicating a plurality of resources allocated to the UE for uplink transmission, wherein the plurality of resources comprise one or more half duplex slots and one or more full duplex slots;

receive control signaling indicating at least one configuration associated with the one or more half duplex slots, the one or more full duplex slots, or both, wherein the at least one configuration indicates one or more parameters corresponding to the one or more half duplex slots, the one or more full duplex slots, or both, wherein the at least one configuration comprises a bit value that indicates the one or more parameters, and wherein:

the one or more parameters comprise a first beam direction and a first beam width for the one or more half duplex slots, and the bit value maps to a second beam direction and a second beam width for the one or more full duplex slots; or the one or more parameters comprise a first beam direction and a first beam width for the one or more full duplex slots, and the bit value maps to a second beam direction and a second beam width associated with the one or more parameters corresponding to the one or more half duplex slots; and transmit one or more uplink messages in accordance with the grant and the control signaling.

28. The UE of claim 27, wherein the one or more processors are individually or collectively further operable to execute the code to cause the UE to:

transmit an indication of a full duplexing capability associated with the UE, wherein the control signaling is based at least in part on the indication.

* * * * *